US010210477B2

(12) United States Patent
Factor

(10) Patent No.: US 10,210,477 B2
(45) Date of Patent: Feb. 19, 2019

(54) MULTI-TENANT MULTI-USER MULTI-AIRLINE CARGO CONSOLIDATION AND PROCESSING CENTER

(71) Applicant: Ronald D. Factor, Houston, TX (US)

(72) Inventor: Ronald D. Factor, Houston, TX (US)

(*) Notice: Subject to any disclaimer, the term of this patent is extended or adjusted under 35 U.S.C. 154(b) by 0 days.

(21) Appl. No.: 15/879,033

(22) Filed: Jan. 24, 2018

(65) Prior Publication Data
US 2018/0225622 A1 Aug. 9, 2018

Related U.S. Application Data

(60) Provisional application No. 62/438,433, filed on Dec. 22, 2016.

(51) Int. Cl.
| | |
|---|---|
| G06F 3/16 | (2006.01) |
| G06K 7/10 | (2006.01) |
| G06F 17/30 | (2006.01) |
| G06F 9/451 | (2018.01) |
| G06Q 10/08 | (2012.01) |
| G10L 13/00 | (2006.01) |
| G10L 13/04 | (2013.01) |

(Continued)

(52) U.S. Cl.
CPC ......... *G06Q 10/087* (2013.01); *G06F 3/0481* (2013.01); *G06F 3/167* (2013.01); *G06F 9/453* (2018.02); *G06F 17/30241* (2013.01); *G06F 17/30554* (2013.01); *G06F 17/30867* (2013.01); *G06F 17/30976* (2013.01); *G06F 17/30979* (2013.01); *G06K 7/10366* (2013.01); *G10L 13/043* (2013.01); *G10L 13/00* (2013.01); *G10L 2015/223* (2013.01)

(58) Field of Classification Search
CPC combination set(s) only.
See application file for complete search history.

(56) References Cited

U.S. PATENT DOCUMENTS

| | | |
|---|---|---|
| 9,196,007 B1 | 11/2015 | Thomas |
| 9,679,332 B2 | 6/2017 | Horstemeyer |
| 9,757,644 B2 | 9/2017 | Rose et al. |

(Continued)

OTHER PUBLICATIONS

Nelson Lee (2008), Maintaining Efficiency with a Multi-level Warehouse Design, IFSPA Session on Airport Planning and Performance ("Lee") (Year: 2008).*

*Primary Examiner* — Peter Ludwig
(74) *Attorney, Agent, or Firm* — Buskop Law Group, P.C.; Wendy Buskop

(57) ABSTRACT

A multi-tenant multi-user multi-airline cargo consolidation and processing center for processing cargo with an enclosed high security small footprint multi-level structure operably connected to an airport. The center having a plurality of secure floors, each secure floor with a secure landside cargo acceptance and delivery area for receiving cargo, a security inspection zone, and an automatic storage and retrieval system zone. The secure floors connect to a cargo build up/break down area via a floor connection mechanism. A transfer vehicle unit load device area and a government agency zone can be used for moving and clearing the cargo. The center can have a plurality of landside entry/exit areas, one for each secure floor and an airside entry/exit area. Scanners connected to a network, reading data devices on the cargo can connect with computers and scheduling models to automate the cargo movement process.

8 Claims, 13 Drawing Sheets

(51) Int. Cl.
*G10L 15/22* (2006.01)
*G06F 3/0481* (2013.01)

(56) References Cited

U.S. PATENT DOCUMENTS

| | | | |
|---|---|---|---|
| 9,760,885 B1 | 9/2017 | Ramalingam et al. | |
| 2002/0130778 A1* | 9/2002 | Nicholson | B65D 5/4233 340/572.1 |
| 2003/0204407 A1* | 10/2003 | Nabors | G06Q 10/08 709/202 |
| 2008/0120129 A1* | 5/2008 | Seubert | G06Q 10/06 705/35 |
| 2008/0121690 A1* | 5/2008 | Carani | G01S 5/0027 235/376 |
| 2008/0217475 A1* | 9/2008 | Allison | B64D 11/00 244/114 R |
| 2009/0116614 A1* | 5/2009 | Kotowski | G01N 23/04 378/57 |
| 2009/0319165 A1* | 12/2009 | Eadie | B64D 9/00 701/124 |
| 2009/0322510 A1* | 12/2009 | Berger | G06Q 10/08 340/539.1 |
| 2010/0134257 A1* | 6/2010 | Puleston | G06K 7/0008 340/10.4 |
| 2016/0148440 A1* | 5/2016 | Kwak | G07C 5/008 701/31.5 |
| 2016/0232489 A1* | 8/2016 | Skaaksrud | G06Q 10/0833 |

\* cited by examiner

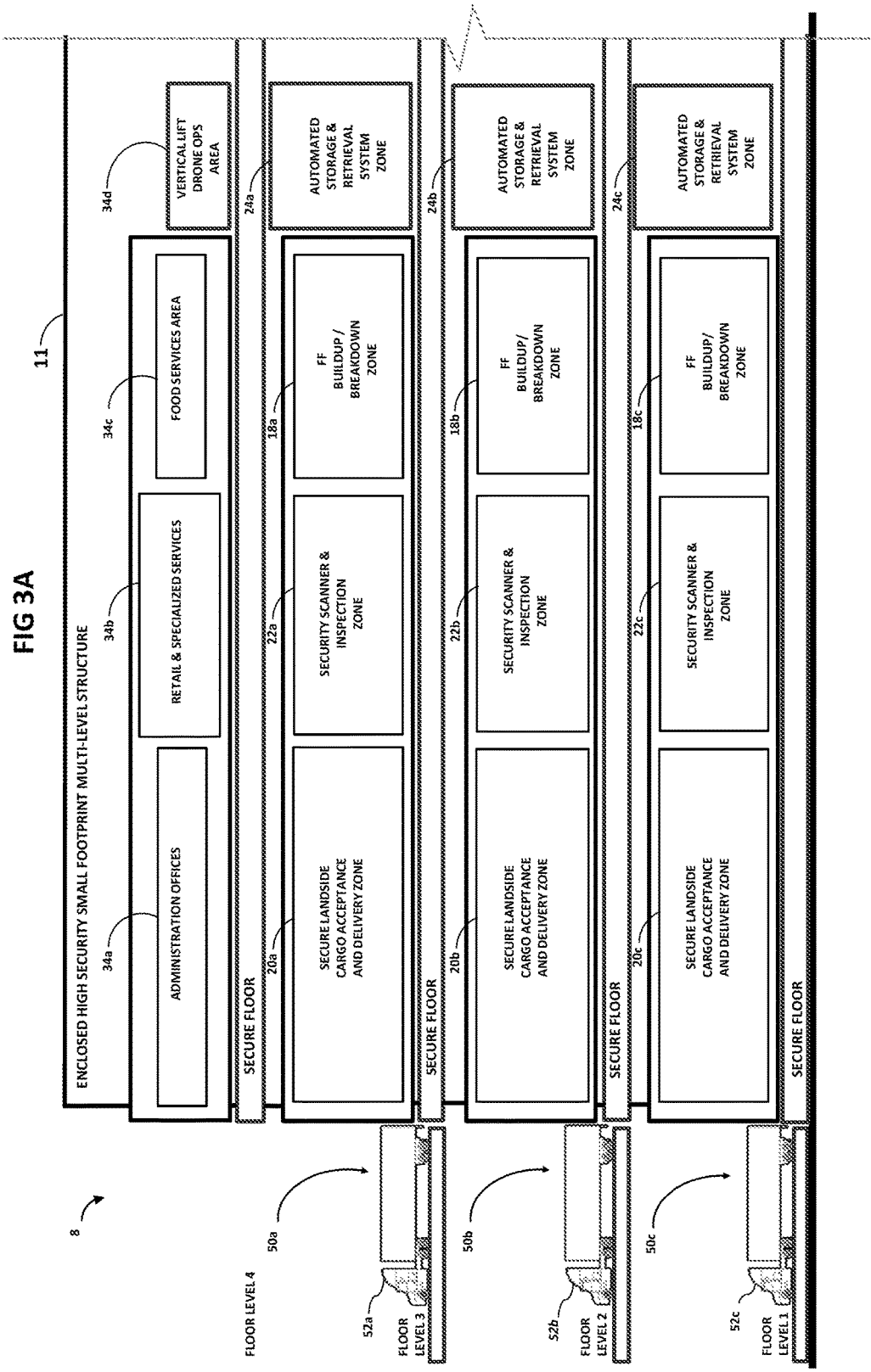

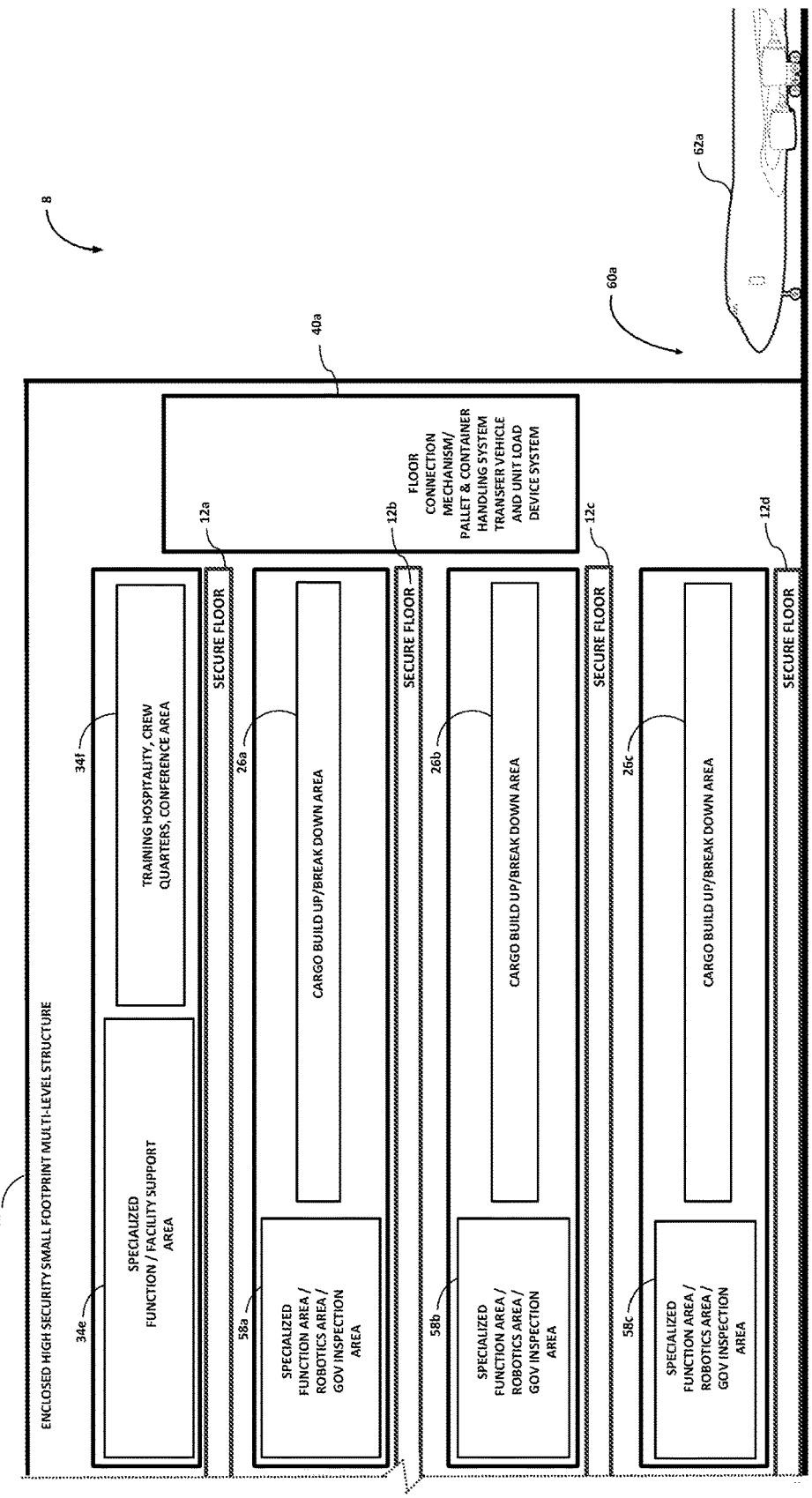

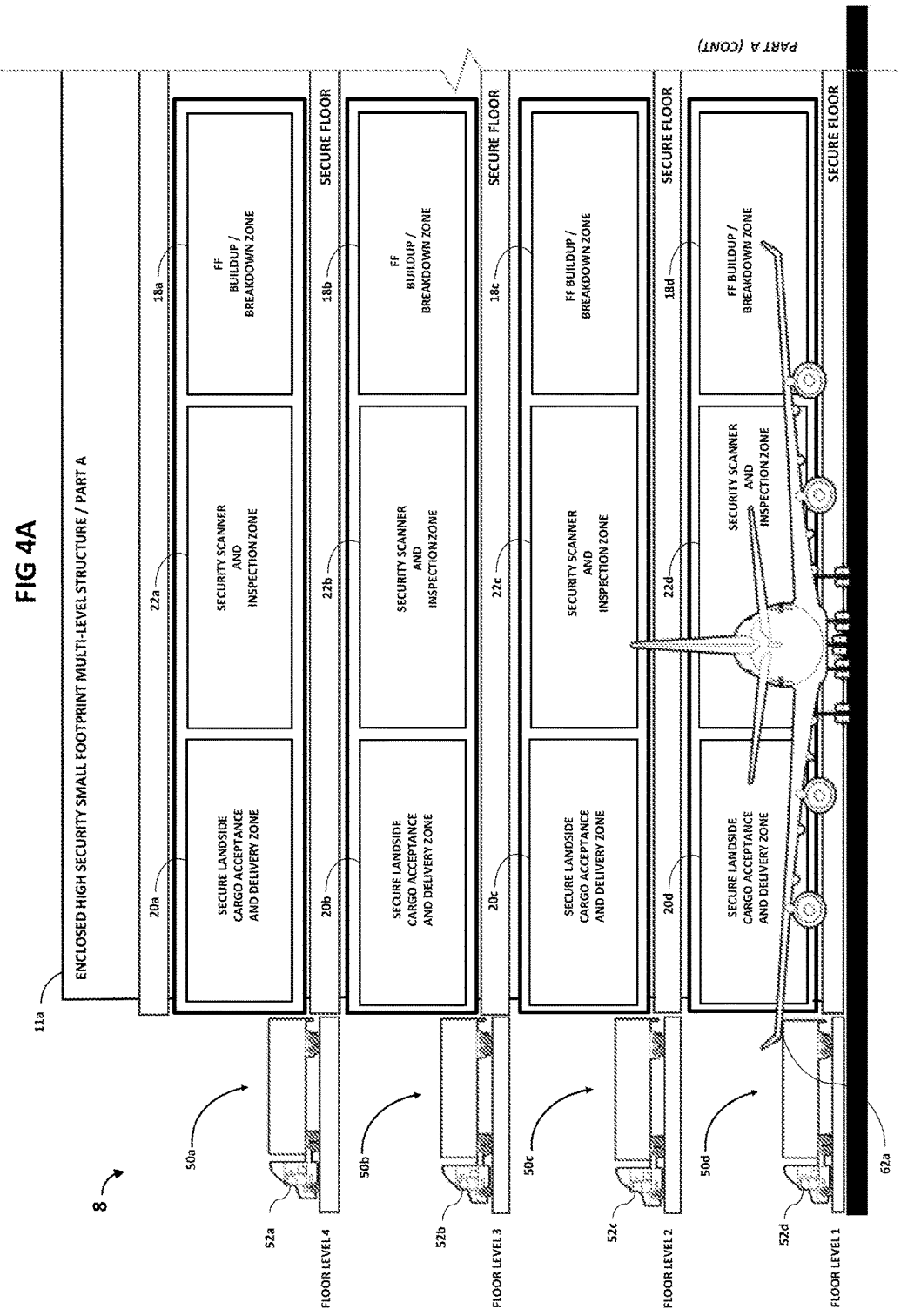

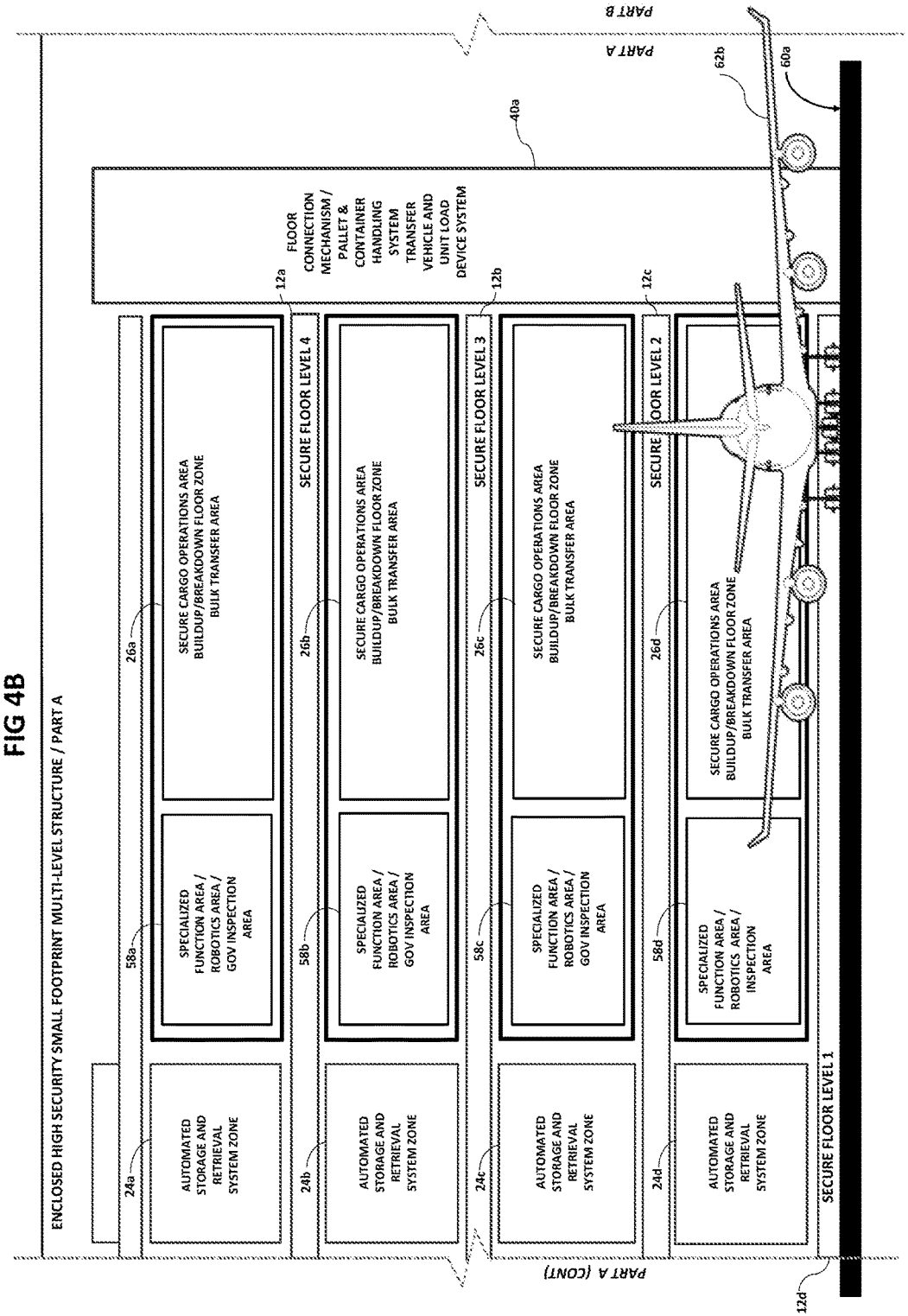

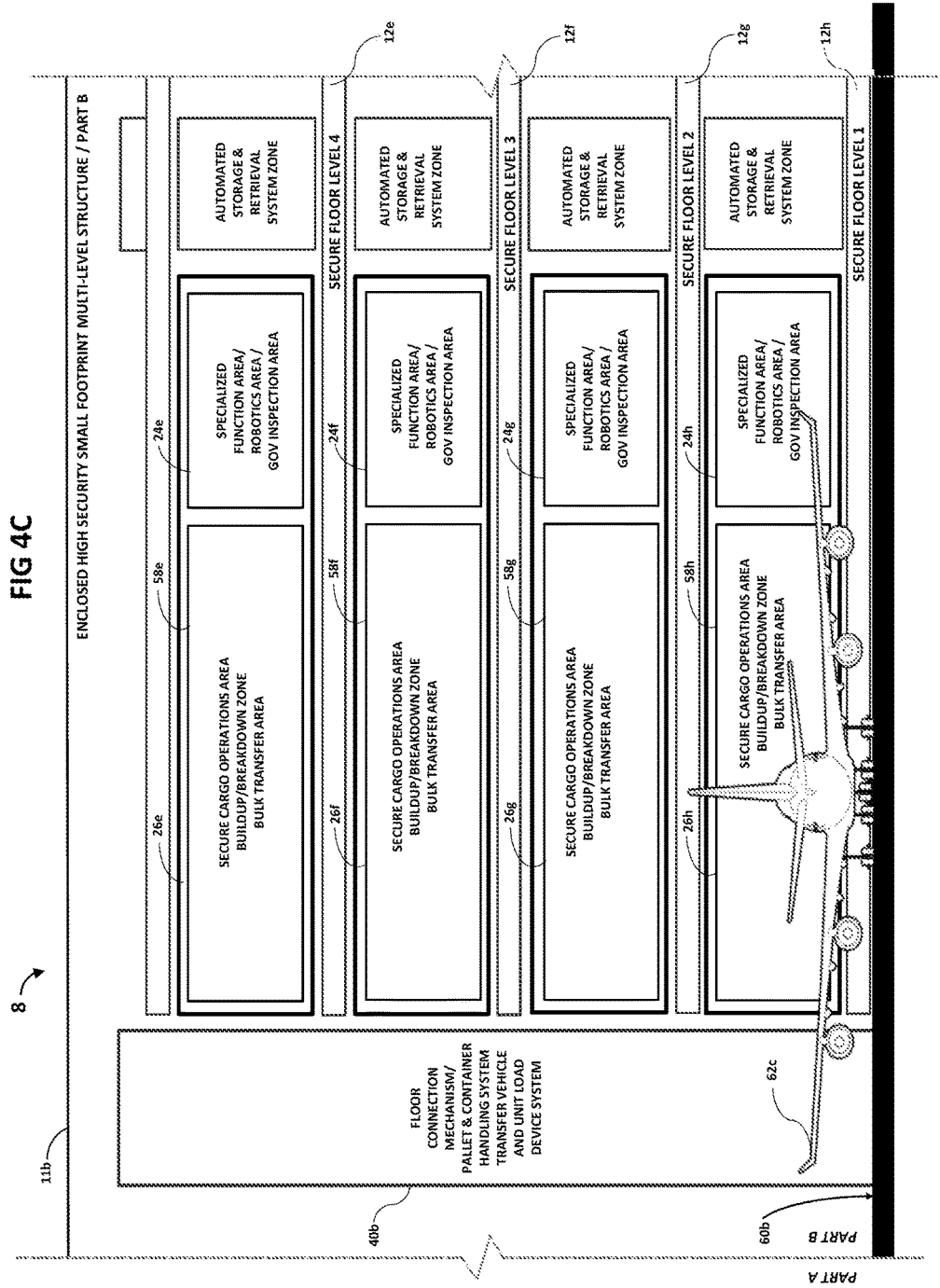

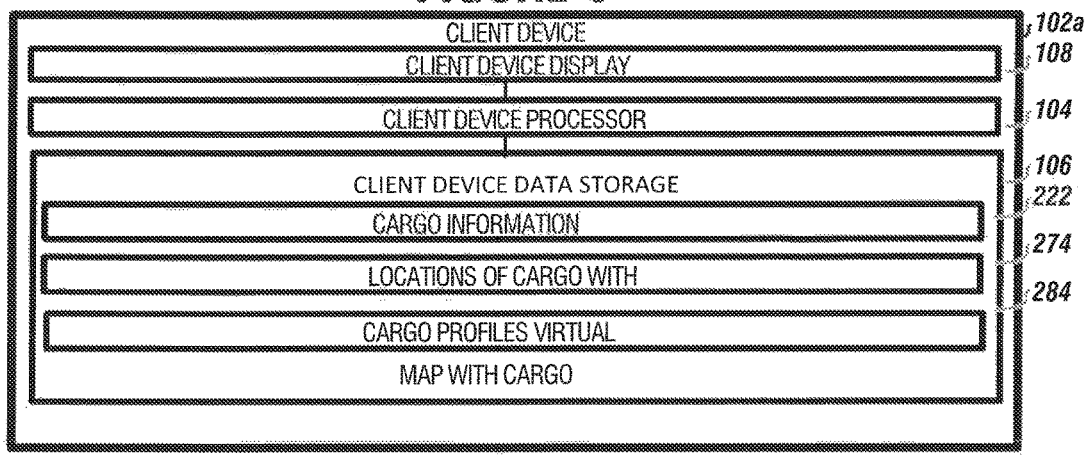
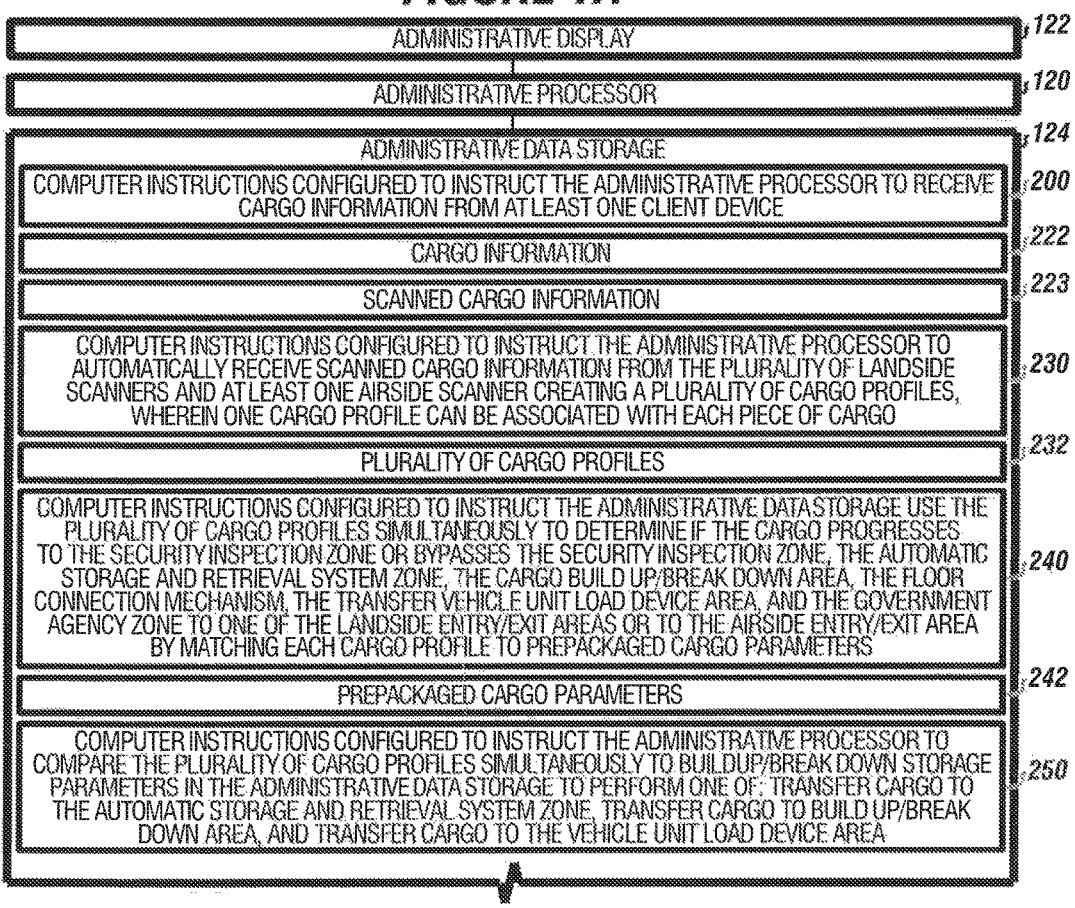

MULTI-TENANT MULTI-USER MULTI-AIRLINE CARGO CONSOLIDATION AND PROCESSING CENTER

CROSS REFERENCE TO RELATED APPLICATIONS

The present application claims priority to and the benefit of U.S. Provisional Patent Application Ser. No. 62/449,991 filed on Jan. 24, 2017, entitled "MULTI-TENANT MULTI-AIRLINE CARGO COLLECTION AND PROCESSING CENTER" This reference is hereby incorporated in its entirety.

FIELD

The present embodiments generally relate to a multi-tenant multi-user multi-airline cargo consolidation and processing center.

BACKGROUND

A need exists for a multi-tenant multi-user multi-airline cargo consolidation and processing center for processing air-eligible cargo that has a small footprint structure with multiple vertical levels, each level owned, leased, rented, or used at least in part by a company, with such cargo consolidation and processing center operably connected to an airport. The cargo consolidation and processing center provides a higher and better use of scarce airport land to process greater volumes of air cargo freight and mail on small land parcels.

Air cargo is a trade facilitator that contributes to global economic development and creating over 68 million jobs worldwide, 11.5 million of which are in the U.S. or 7.8% of all U.S. jobs. The global economy depends on the ability to reliably deliver not only e-commerce consumer products, but all kinds of high-quality, high-value, time-sensitive and perishable products fast and economically at competitive prices to consumers worldwide. Air cargo transports over US $7 trillion worth of goods, accounting for approximately 35% of world trade by value.

Dependency on air transport to deliver goods associated with e-commerce will layer new volumes of cargo onto the air transport industry, putting greater throughput pressure on aviation infrastructure. The global economy and the creation of millions of new jobs are dependent on a healthy, thriving air cargo industry, but most gateway airports in the world, and especially in the U.S. are not able to keep pace. The nature of global commerce is also changing, casting new light on the merits of air transport and its advantaged importance as the most reliable mode of delivering goods faster and more economically than ever imagined before.

Most U.S. gateway airports (and many European gateway airports) are based on old and outdated infrastructure and are severely land constrained, creating operational bottlenecks and chokes on air cargo flow capacities and efficiencies, thus not keeping pace with global air cargo trade growth. Future cargo throughput functional interdependencies cannot be efficiently or economically accommodated by the functionally and operationally obsolete box-structured single-story cargo facility warehouses that are sometimes without aircraft adjacency, in most cases without adequate landside, planning for modern 53' truck trailers, and without appropriate cargo security systems posing increased probability of human and material losses associated especially with the increasing transport of cargo-borne explosives and lethal materials in belly holds of modern wide-body passenger aircraft.

To provide viable solutions meeting cargo volume throughput forecasts and to constrain or reduce air cargo facility footprint area, a thoroughly modern, mechanized, systematized vertical cargo consolidation and processing structure is required.

The present embodiments meet these needs.

BRIEF DESCRIPTION OF THE DRAWINGS

The detailed description will be better understood in conjunction with the accompanying drawings as follows:

FIG. 3 depicts side view of a multi-tenant multi-user multi-airline cargo consolidation and processing center according to one or more embodiments FIGS. 4A-4D depict depicts a side view of a multi-tenant multi-user multi-airline cargo consolidation and processing center.

FIG. 6 depicts a client device usable in the multi-tenant multi-user multi-airline cargo consolidation and processing center according to one or more embodiments.

FIGS. 7A and 7B depict an administrative processor with an administrative data storage according to one or more embodiments.

Figure 1:
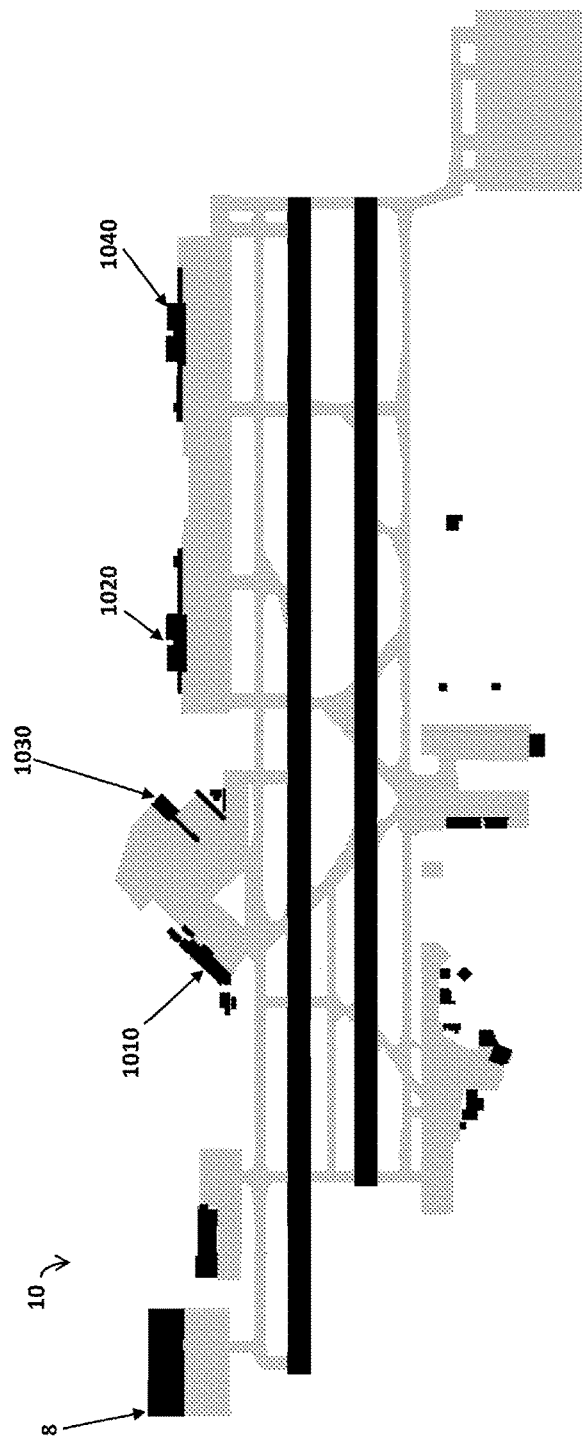
FIG. 1 is a diagram showing a multi-tenant multi-user multi-airline cargo consolidation and processing center in context of a representative airport according to one or more embodiments.

The present embodiments are detailed below with reference to the listed Figures.

DETAILED DESCRIPTION OF THE EMBODIMENTS

Before explaining the system in detail, it is to be understood that the system is not limited to the particular embodiments and that it can be practiced or carried out in various ways.

The present embodiments relate to a multi-tenant multi-user multi-airline cargo consolidation and processing center (CCPC) for processing cargo operably connected to an airport.

The multi-tenant multi-user multi-airline cargo consolidation and processing center can have an enclosed high security small footprint multi-level structure and a plurality of secure floors, wherein each secure floor can have a secure landside cargo acceptance and a delivery area for receiving cargo.
}

In embodiments, each secure floor can have a security inspection zone and an automatic storage and retrieval system zone.

In embodiments, each secure floor can connect to a cargo build up/break down area via a floor connection mechanism.

A transfer vehicle unit load device area and a government agency zone can be used for moving and clearing cargo.

The enclosed high security small footprint multi-level structure can have a plurality of landside entry/exit areas. In embodiments, each sure floor can have at least one landside entry/exit area.

The enclosed high security small footprint multi-level structure can have an airside entry/exit area.

Scanners can be connected to a network for reading RFID chips on cargo or on other data devices, which can be mounted to cargo, and can be connected with computers and scheduling models to automate the cargo movement process onto and off of both land based transport vehicles and air based transport vehicles.

The cargo consolidation and processing center will increase throughput capacity and efficiency, decrease cost, and capture, then grow marketplace share of airports and airlines while maintaining a small footprint within congested airport properties.

A cargo consolidation and processing center solution integrates a complete infrastructure work platform and process center with multiple and different data-based operating cargo processes within highly secure airport environments.

The embodiments provide an efficient work platform for a multi-level multi-tenant multi-user cargo consolidation and processing center within highly secure airport environments. A variety of user functions may occur within the CCPC infrastructure simultaneously, such as general and specialized cargo throughput, such as perishable goods, pharmaceuticals, electronics, valuable goods, artwork, currency, bank notes, time-definitive materials and products, medical devices, human organs or genome material, dangerous goods, post and parcel goods, consolidated goods and provisions, any commodity or object requiring air transport, distribution to retail and food service operations within security sterile zones at airports, and e-commerce commodities and products consolidation and distribution.

A cargo consolidation and processing center provides for a central, consolidated, efficient, cost-effective, and secure interchange platform between surface vehicles such as trucks, vans, automobiles, armored vehicles, tug and dolly trains, and aircraft within highly secure airport environments.

The embodiments provide the flexibility for accommodating other cargo-processing and aviation-related operations. Administration office environments related to cargo-processing can be accommodated within the multi-level CCPC structure or at roof levels. Aviation-related functions such as flight training, flight simulation, employee training, and crew quarters can be accommodated on CCPC roof levels. And, food service operations can be located at strategic locations within the CCPC.

The embodiments incorporate a multi-layered data monitoring, piece-good identification track and trace, off-site truck monitoring management, shipper data management, intact pallet inspection and screening, intact ULD inspection and screening, facility security monitoring, enhanced airside security, and high security aircraft operations area that when all is considered, the CCPC offers a unique data-based and human backbone for enhanced security operations and monitoring.

Key benefits of the cargo consolidation and processing center to Airport Management are cargo volume capacity expansion in a reduced land surface area, enhanced consolidation of an Airport's cargo marketshare, faster cargo volume growth, new job creation, increased public sector revenue, reduced greenhouse emissions, enhanced specialized service capability, increased public safety and security, reduced terrorist event potential, averting potential death through enhanced cargo security and inspection, and fueling economic growth and new job creation.

Key benefits to Surface Transport Providers are greater trip efficiency, reduced truck wait times, reduced public roadway congestion, enhanced cargo transfer efficiencies, pre-arrival airway bill processing, increased aviation security through off-site cargo screening and shipper verification, and reduced emissions.

Key benefits to Security/Regulatory Agencies are increased throughput inspection efficiencies, data-management on a piece-good level, enhanced inspection and security processing, enhanced government agency inspection facilities, enhanced airside security, and a combination of security inspection processes resulting in reduced threats of terrorist events insuring airline passenger safety.

Key benefits to Cargo Operations Management are reduced throughput cost, higher throughput productivity, enhanced track and trace on a piece-good basis, virtual pallet and MD buildup/breakdown, enhanced human work conditions, enhanced human safety, low emission infrastructure, environmentally sustainable facility, reduced facility operating cost, and enhanced security for the flying public.

Key benefits to Airlines are reduced cost, higher KPIs, improved margins, increased security, enhanced track and trace on a piece-good basis, improved cargo capacity, reduced turnaround times, and reduced threat of terrorist events improving airline passenger safety.

Key benefits to the Shippers/Consignees/Consumers and Airline Passengers sector are reduced cost, reliable delivery procedures, predicable higher quality performance, increased efficiencies in supply-chain logistics, improved consumer-based expectation, increased airline passenger security and reduction in death probabilities, and in human parts and medical device-related transactions saved human lives. The term "air based transport vehicles" as used herein can refer to any known air based vehicles, such as airplanes, jets, helicopters, drones, and other vessels which can fly from one point to another carrying cargo.

The term "airside entry/exit area" as used herein can refer to the area where an aircraft or air based transport vehicle transfers cargo to or from such vehicle and the high security small footprint multi-level structure.

The term "airport" as used herein can refer to any airstrip where air transport vehicles can land, which can be capable of moving cargo via the air.

The term "automatic storage and retrieval system zone" as used herein can refer to an automated system that scans, stores and deliver cargo based on cargo information and scanned cargo information.

The term "cargo" as used herein can refer to air eligible cargo.

The term "cargo build up/break down area" as used herein can refer to a zone where eligible air cargo is formed up on pallets or unit load devices for placement on an air transport vehicle or broken down from a pallet or unit load devices that has been unloaded from an air transport vehicle.

The term "cargo information" as used herein can refer to information on cargo provided by a shipper and/or consignor prior to the cargo entering the structure.

The term "cargo profile" as used herein can refer to the cargo information plus the scheduling information with transport vehicle identifiers, storage zone identifiers, and duration to destination times required by the cargo.

The term "client device" as used herein can refer to any known client device, such as cellular and smart phones, laptops, computers, tablet computers, combinations thereof, or other processing devices capable of bidirectional communication.

The term "data storage" as used herein refers to a non-transitory computer readable medium, such as a hard disk drive, solid state drive, flash drive, tape drive, and the like. The term "non transitory computer readable medium" excludes any transitory signals but includes any non-transitory data storage circuitry, e.g., buffers, cache, and queues, within transceivers of transitory signals.

The term "display" as used herein can refer to an electronic display for presenting results from processing of data by one or more processors.

The term "floor connection mechanism" as used herein can refer to an automated device that transfers air eligible cargo from one of the secure floors to a transfer vehicle unit load device area.

The term "high security" as used herein can refer to a level of government imposed security such as that applied by the United States Transportation Security Administration "TSA" in airports in the United States.

The term "land based transport vehicles" as used herein can refer to trucks, semi-trucks, such as 18-wheeler trucks, barges, cars, and other devices capable of moving on the earth and delivering cargo, and can also include trains and light rail systems.

The term "landside entry/exit area" as used herein can refer to the portion of the structure which land based vehicles access to load or unload air eligible cargo.

The term "landside scanner" as used herein can refer to a bar code reader, a radio frequency identification reader, or other scanning device, such as an optical character reader for receiving information directly from a radio frequency identification chip or other data device. Which can be positioned on the air eligible cargo.

The term "multi-tenant" as used herein can refer to a structure with more than one tenant.

The term "multi-user" as used herein can refer to a structure with more than one user.

The term "network" as used herein can refer to any known network, such as a satellite network, a cellular network, a global processing network, such as the internet, a local area network, a wide area network, or combinations thereof.

The term "processor" as used herein can refer any known processor, such as a computer, a handheld processing device, a laptop, a wearable computer, a tablet computer, a cloud computing processor or server, or combinations thereof.

The term "pallet" as used herein can refer to a cargo load organization device that permits one or more cargo units to be organized and placed.

The term "robotics" or "robots" as used herein can refer to a device used in the processing of cargo that is related to a branch of engineering that involves the conception, design, manufacture, and operation of robots. A robotic device used in cargo processing is a machine composed of electronics, computer science, artificial intelligence, mechatronics, nanotechnology and bioengineering and is utilized in the processing of cargo as an aid to human endeavors to promote safety, promote work efficiencies, increase speed and accuracy of throughput, increase productivity, relieve fatigue, and protect from unsafe and dangerous work activities.

The term "secure floors" as used herein can refer to floors which can only be entered by goods and personnel that have cleared a security scan of some type to prevent ordinance, guns, bombs, toxic chemicals, toxic liquids or gas, lethal weapons or other deadly materials from passing into or out of an air based transport vehicles.

The term "secure landside cargo acceptance and delivery area" as used herein can refer to a truck, vehicle area adjacent to the structure.

The term "security inspection zone" as used herein can refer to a zone which is used to electronically and physically scan for ordinance, guns, bombs, toxic chemicals, toxic liquids or gas, lethal weapons or other deadly materials, and can include insects carrying diseases, such as mosquitoes, and banned pests, such as weevils, worms or other invasive species harmful to humans and agriculture.

The term "small footprint" as used herein can refer to a structure that provides required floor area in a vertical format and reducing ground level footprint or the horizontal format that may be designed to minimize ground area coverage.

The term "static rack" or "static rack storage" as used herein can refer to an individual storage unit or a collection of storage units that can be one or more levels in height and used to store bulk-cargo or piece-cargo items before pallet or unit load device build-up, or to store bulk-cargo or piece-cargo items after pallet or unit load device break-down.

The term "structure" as used herein can refer any structure, such as a multi-level vertical structure having a small footprint.

The term "tenant" as used herein can refer to an airline, cargo operator, cargo handler, freight forwarder, logistics provider, postal service provider, cargo service provider, ground handler service provider, e-commerce provider, e-commerce distributor, aviation services specialist, flight simulator service provider, aviation or cargo operations administrative organizations, aviation equipment service providers, and/or retail, banking, and food service providers serving users of the structure.

The term "transfer vehicle unit load device area (TV ULD)" as used herein can refer to an area with automated mechanizations or systems that loads built up cargo on pallets or unit load devices or removes cargo on pallets or unit load devices for break down.

The term "unit load device" as used herein can refer to a cargo load organization device that permits one or more cargo units or cargo pieces to be organized and placed within a three-dimensional enclosed device pre-shaped to aircraft specifications.

In embodiments, the data device on the cargo can be radio frequency identifier devices (RFID), a computer readable medium with electronic air bills, and an air bill readable by an optical character recognition reader connected to the network to electronically convert the air bill into a cargo profile and transmit the cargo profile to the administrative processor via the network.

In embodiments, at least a portion of one of the secure floors is temperature, and humidity controlled and wherein cargo information contains humidity and temperature requirements.

In embodiments, at least a portion of one of the secure floors is a high-value material, dangerous goods, flammables, radioactive materials, pharmaceutical goods, or valuables vault, secure storage area, and a consolidation and retrieval area for such specialized goods and materials.

In embodiments, at least one tenant can be a consignor, a shipper, a recipient, or a freight forwarder.

Turning now to the Figures, FIG. 1 depicts a diagram of the cargo consolidation processing center (CCPC) 8 with a secure aircraft operations 13 area in context of an airport.

The airport 10 has four terminals, such as terminal 1 1010, terminal 2 1020, international arrivals terminal 1030, and terminal 4 1040.

Figure 2:
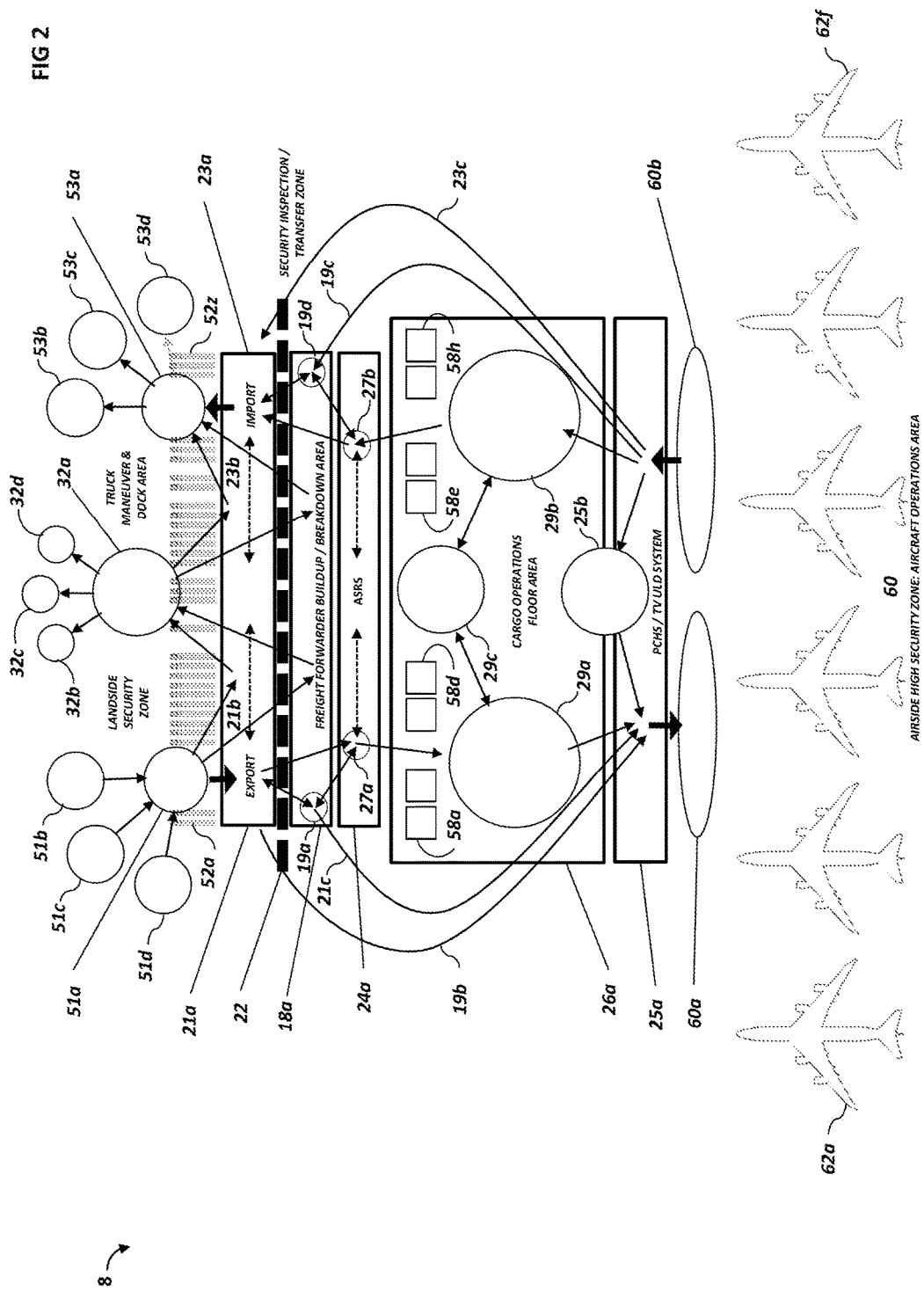
FIG. 2 depicts the one-level operational flow diagram of the multi-tenant multi user multi-airline cargo consolidation and processing center according to one or more embodiments.
Figure 4D:
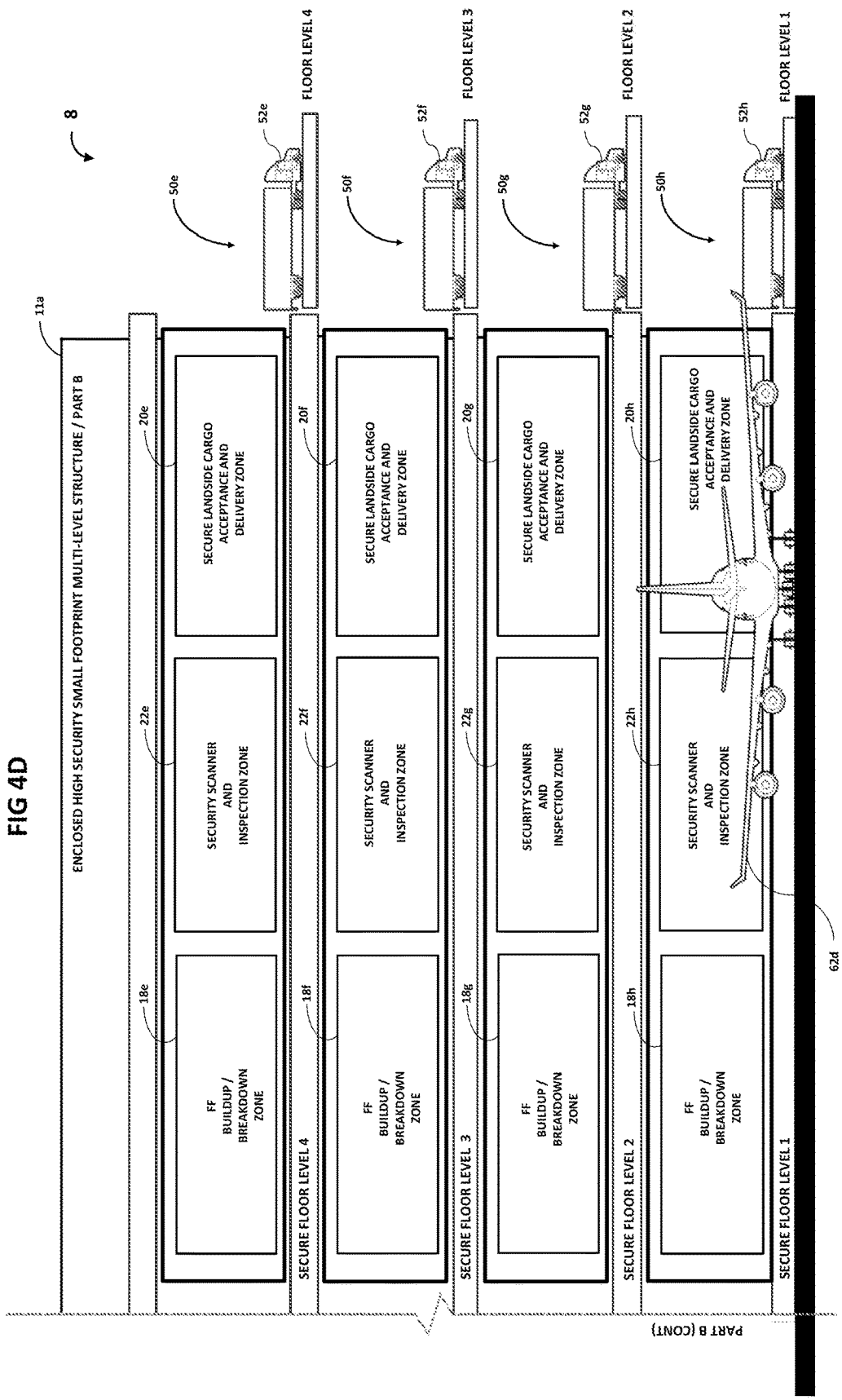

FIG. 2 depicts the one-level operational flow diagram of the multi-tenant multi user multi-airline cargo consolidation and processing center 8.

A landside entry/exit area 50a is shown for receiving and transferring the cargo to and from a plurality of land based transport vehicles, which includes a truck traffic area/export 51a with shipper truck traffic 51b, freight forward truck traffic 51b, and other traffic 51d and truck traffic area/import 53a with consignee truck traffic 53b, freight forwarder truck traffic 53c and other truck traffic 53d.

In embodiments a road feeder service (RFS) operations/airport to airport 32a for land based vehicle transfer of imported/exportable cargo to and from other airports, with such cargo not traversing the secured areas of the CCPC structure, which includes RFS to/from. Airport A 32b, RFS to/from Airport B 32c, and RES to/from Airport C 32d.

A secure landside cargo acceptance and delivery area for receiving the cargo is shown with an acceptance area/export 21a that includes acceptance area transfer/cross utilization 21b and pallet/intact unit bypass 21c and a delivery area/import 23a that includes delivery area transfer/cross utilization 23b and pallet/intact unit bypass 23c.

A security inspection zone 22 is shown for inspecting the cargo.

In embodiments, a freight forwarder build up and breakdown zone 18 for allowing a third party user to build up cargo for an airside delivery and breakdown or buildup cargo for landside delivery encompasses a freight forwarder buildup area/export 19a, an ULD bypass to PCHS/TV ULD System or airside 19b, an ULD bypass from PCHS/TV ULD System or airside 19c, and freight forwarder breakdown area/Import 19d.

The multi-tenant multi user multi-airline cargo consolidation and processing center 8 contains an automatic storage and retrieval system zone 24a. The automatic storage and retrieval system zone 24a includes ASRS/Export Transfer 27a and ASRS/Import Transfer 27b.

A cargo build up/break down area 26a is shown. The build up/break down area 26a includes export buildup work stations 29a, import breakdown work stations 29b, bulk cargo transfer 29c, and government inspection area, robotic area, and special function/environment areas 29d.

In embodiments, a pallet/container handling system/transfer vehicle unit load device system, PCHS/TV ULD System 25a, with an intact unit transfer 25b for storage, retrieval and vertical conveyance of palletized and unit load device contained cargo is shown.

In embodiments, an airside entry/exit area 60a, 60b is shown, connected to the government agency inspection zone, for receiving and transferring the cargo to and from a plurality of air based transport vehicles.

FIG. 3 depicts a side view of a multi-tenant multi-user multi-airline cargo consolidation and processing center according to one or more embodiments In embodiments the multi-tenant multi-user multi-airline cargo consolidation and processing center is a single-structure CCPC, 3-floor level variant with specialized rooftop functions.

The multi-tenant multi-user multi-airline cargo consolidation and processing center 8 processes cargo.

The multi-tenant multi-user multi-airline cargo consolidation and processing center 8 can have an enclosed high security small footprint multi-level structure 11, such as a four-story tall structure, which may have a footprint of less than 100,000 square feet.

The multi-tenant multi-user multi-airline cargo consolidation and processing center 8 can have a plurality of secure floors 12a-12d, which can be connected one on top of the other in the enclosed high security small footprint multi-level structure 11.

In some embodiments, the structure can be at least one story tall, and can be up to eight stories tall in other embodiments.

In embodiments, the structure or structures can contain administrative and other user-related, tenant-related, or airline-related functions, such as employee accommodation, food service, training and conferencing rooms, crew quarters, training centers, clinics, retail support services, offices, and facility support areas 34a-34f. Such administrative and other areas may be located on roof levels of the structure or structures, or in vertical structures adjacent to the cargo consolidation and processing center.

In embodiments, each secure floor 12a-12d can be solely under the control of at least one tenant. In embodiments, the tenant can be a leaseholder, a renter, or an owner.

For example, secure floor 12a can be under the control of ABC Company that has leased 50 percent of the secure floor and DEF Company that has leased the other 50 percent of the secure floor, while secure floor 12b can be rented to just one company, GHI Company.

A plurality of landside entry/exit areas 50a-50d can be secured to the enclosed high security small footprint multi-level structure 11.

In embodiments, each landside entry exit area 50a-50d can be used for one of the plurality of secure floors 12a-12d.

Each landside entry/exit area 50a-50d can be used for receiving and transferring cargo to and from a plurality of land based transport vehicles 52a-52d respectively.

In embodiments, each secure floor 12a-12d can have at least one of a plurality of secure landside cargo acceptance and delivery areas 20a-20c for receiving cargo.

In embodiments, each secure floor 12a-12d can have at least one security inspection zone 22a-22c for inspecting cargo connected to the secure landside cargo acceptance and delivery area 20a-20d respectively.

Each security inspection zone 22a-22c can have at least one of a plurality of landside scanners.

In embodiments, each secure floor 12a-12d can have at least one freight forwarder build up and breakdown zone 18a-18c for allowing a third party user to build up cargo for an airside delivery and breakdown or buildup cargo for landside delivery In embodiments, each secure floor 12a-12d can have at least one automatic storage and retrieval system zone ("ASRS") 24a-24d for storing and delivering small unit or piece cargo. In embodiments, the storing of the cargo can be within another multi-level storage area on the secure floor or can be interconnected between floors for transferring small unit or piece cargo from or to the plurality of secure floors.

In embodiments, some secure floors 22a-22d can have their own static rack storage and retrieval units for the purpose of storing and retrieving bulk-cargo or piece-cargo.

In embodiments, some secure floors 12a-12d can have their own robotic devices to build up/break down palletized cargo or cargo contained in unit load devices.

In embodiments, each secure floor can have at least specialized function area/robotics area/government inspection zone 58a-58c.

The specialized function area/robotics area/government inspection zone 58a-58c can be used for providing customs clearances and other government agency clearances for cargo.

In embodiments, the specialized function area/robotics area/government inspection zone 58a can be shared by the plurality of secure floors 12a-12d.

In other embodiments, one or more of the plurality of secure floors can have their own specialized function area/robotics area/government inspection zone 58a-58c.

In embodiments, some secure floors 12a-12d can have their own cargo build up/break down area 26a-26d to build up air eligible cargo or break down cargo from an air based transport vehicle.

In other embodiments, some secure floors 12a-12d can share the cargo build up/break down area 26a-26b so there is only one cargo build up/break down area per enclosed high security small footprint multi-level structure 11.

In embodiments, the plurality of secure floors 12a-12d can be connected by a floor connection mechanism/pallet and container handling system and transfer vehicle unit load device system 40a for transferring cargo from or to the plurality of secure floors.

The multi-tenant multi-user multi-airline cargo collection and processing center 8 can have at least one airside entry/exit area 60a with at least one airside scanner.

The airside entry/exit area 60a can be securely connected to the specialized function area/robotics area/government inspection zone 58a to provide secure transfers between the air based transport vehicle and the government agency inspection zone 28.

The airside entry/exit area 60a can be configured for receiving and transferring cargo to and from at least one air based transport vehicles 62a through the enclosed high security small footprint multi-level structure 11. The air based transport vehicle 62a, shown here as a jet aircraft, is shown at an airport.

In embodiments, a floor connection mechanism/pallet and container handling system and transfer vehicle unit load device system 40a can be connected to the specialized function area/robotics area/government inspection zone 58a, which can be used for providing customs clearances and other government agency clearances for cargo.

The plurality of landside scanners can be used to verify and authenticate air eligible cargo. At least one landside scanner can be positioned in the security scanner and inspection zone to automatically scan a data device on the cargo. Each landside scanner can be connected to a network.

FIGS. 4A-4D depict depicts a side view of a multi-tenant multi-user multi-airline cargo consolidation and processing center.

In embodiments the multi-tenant multi-user multi-airline cargo consolidation and processing center is a double-structure CCPC 4-floor level variant.

The multi-tenant multi-airline cargo consolidation and processing center 8 is shown having an enclosed high security small footprint multi-level structure 11a and 11b on each side.

In embodiments, the multi-tenant multi-airline cargo consolidation and processing center 8 can have a plurality of landside entry/exit areas 50a-50h. Each landside entry/exit area is connected to at least one of the plurality of secure floors. Each landside entry/exit area can receive and transfer the cargo to and from a plurality of land based transport vehicles 52a-52h.

In embodiments, a plurality of secure floors 12a-12h includes the following: a plurality of secure landside cargo acceptance and delivery areas 20a-20h for receiving the cargo, security scanner and inspection zones 22a-22h for inspecting the cargo, freight forwarder build up and breakdown zones 18 for allowing a third party user to build up cargo for an airside delivery and breakdown or buildup cargo for landside delivery, automatic storage and retrieval system zones 24a-24h for storing and retrieving the cargo, specialized function area/robotics area/government inspection zones 58a-58h connected to a transfer vehicle unit load device area, and a cargo build up/break down areas 26a-26d to build up the cargo or break down the cargo.

The double-structure CCPC 4-floor level variant can have two floor connection mechanism/pallet and container handling systems and transfer vehicle unit load device systems 40a and 40b for transferring the cargo from or to the plurality of secure floors.

In embodiments, the double-structure CCPC 4-floor level variant can have two transfer vehicle unit load device areas 28 for connecting with the floor connection mechanisms.

The double-structure CCPC 4-floor level variant can have a plurality of airside entry/exit area 60 connected to the government agency zone, the airside entry/exist area configured for receiving and transferring the cargo to and from a plurality of air based transport vehicles 62a-62.

In embodiments, a plurality of landside scanners can be used to verify and authenticate air eligible cargo. At least one landside scanner can be positioned in the security scanner and inspection zone to automatically scan a data device on the cargo.

Each landside scanner can be connected to a network.

In embodiments, at least one airside scanner positioned on each airside entry/exit area. The at least one airside scanner can be positioned to automatically scan the data device on the cargo. The at least one airside scanner can be connected to a network.

Figure 5:
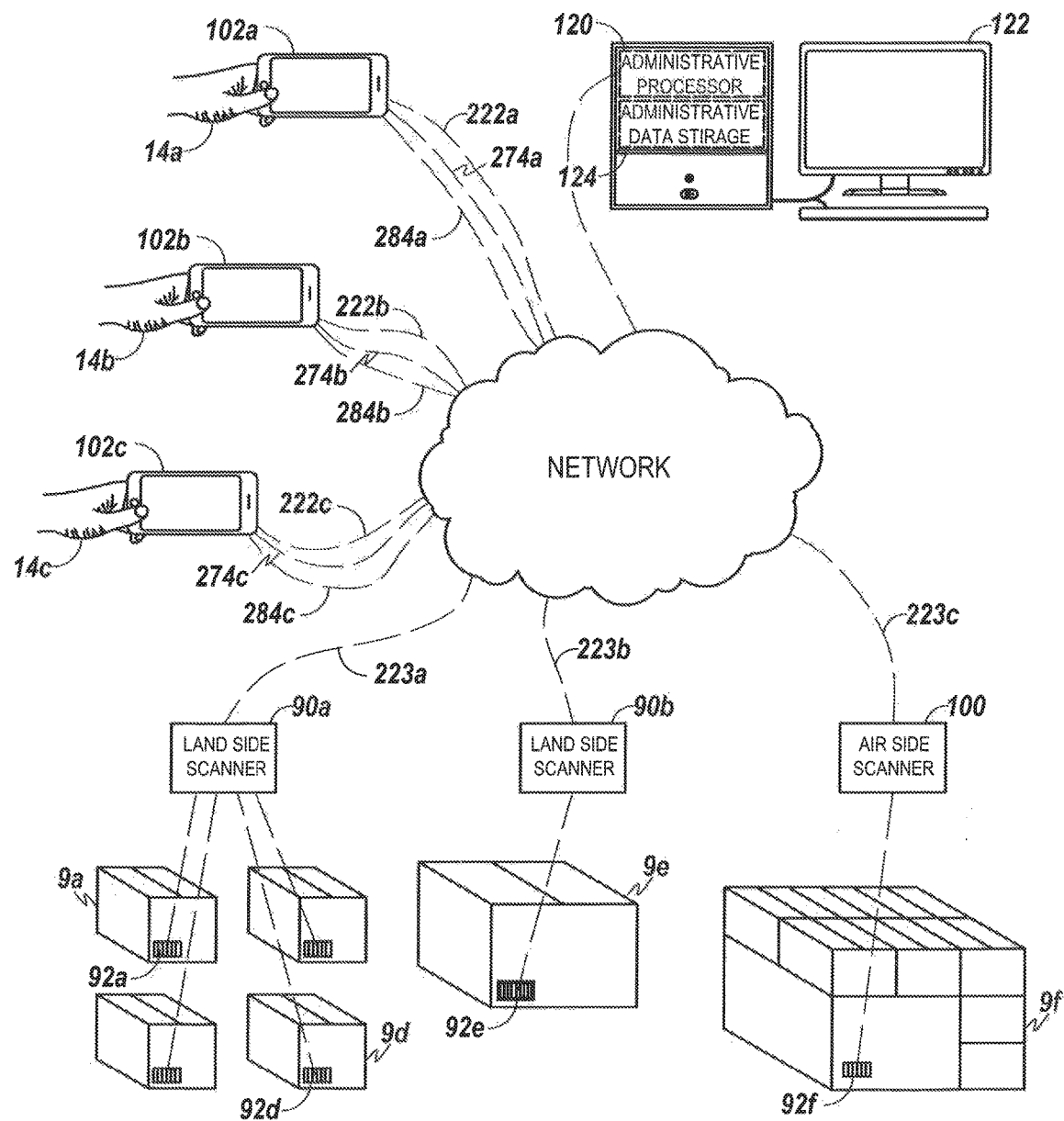
FIG. 5 depicts tenants connected to a network and an administrative processor according to one or more embodiments.

FIG. 5 depicts tenants connected to a network and an administrative processor according to one or more embodiments.

In embodiments, the tenants 14a-14c can each have a client device 102a-102c, which can be connected to a network 80 and an administrative processor 120. In embodiments, the client devices can also be connected to or in communication with the landside scanners 90a-90b and the airside scanners 100.

The administrative processor is shown in communication with the network 80, an administrative data storage 124 and an administrative display 122.

In embodiment, the landside scanners 90a-90b and the airside scanner 100 can automatically scan data devices 92a-92f, wherein each data device can be mounted on the cargo 9a-9e respectively. The data devices 92a-92f can contain scanned cargo information 223a-223c, which can be provided to the network 80.

At least one client device 102a-102c can transmit cargo information 222a-222c to the network 80, which can then be captured by the administrative processor 120 and stored in the administrative data storage 124.

The administrative processor 120 can transmit locations of the cargo with the plurality of cargo profiles The administrative processor 120 can transmit locations of cargo with cargo profiles 274a-274c via the network 80 to at least one client device 102a-102c.

For example, tenant 14c can be a shipper or a consignor. In embodiments, the administrative processor can use priority groupings tied to ownership of the cargo, ownership of the transport vehicle, ownership of the secure floor, and federal or government agencies supplying approval to receive and deploy cargo to transmit the locations of cargo with cargo profiles.

The administrative processor 120 can periodically transmit a virtual map with cargo 284a-284c depicting locations of the cargo within the structure, within land or air-based transport vehicle, or en route within the airport to at least one client device of at least one tenant, shipper, and consignor using the multi-tenant multi-airline cargo collection and processing center.

FIG. 6 depicts a client device usable in the multi-tenant multi-airline cargo collection and processing center according to one or more embodiments.

The at least one client device 102a, is shown with a client device display 108, a client device processor 104, which can be connected to the client device display 108, and a client device data storage 106.

In embodiments, the client device data storage 106 can contain, but is not limited to: cargo information 222, locations of cargo with cargo profiles 274, and a virtual map with cargo 284.

Figure 7B:
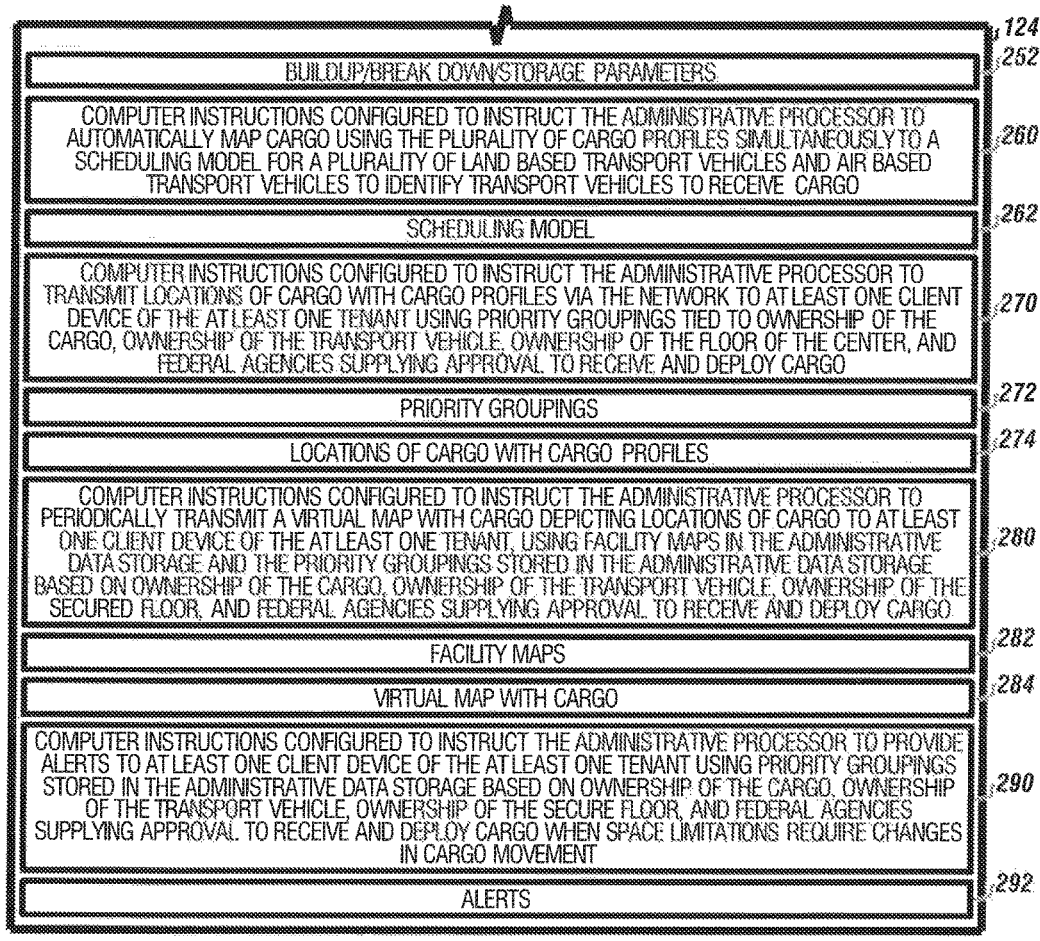

FIGS. 7A and 7B depict an administrative processor with an administrative data storage according to one or more embodiments.

In embodiments, the administrative processor 120 can be connected to or in communication with an administrative display 122 and an administrative data storage 124.

The administrative data storage 124 can have computer instructions 200 configured to instruct the administrative processor to receive cargo information from at least one client device.

In embodiments, at least one client device can be controlled by at least one tenant, which can provide the cargo information in advance of the cargo arriving at the enclosed high security small footprint multi-structure level.

The administrative data storage 124 can contain cargo information 222 and scanned cargo information 223.

In embodiments, the scanned cargo information 223 can verify the cargo information 222 transmitted from the at least one client device.

The administrative data storage 124 can have computer instructions 230 configured to instruct the administrative processor to automatically receive scanned cargo information from the plurality of landside scanners and at least one airside scanner creating a plurality of cargo profiles, wherein one cargo profile can be associated with each piece of cargo.

The administrative data storage 124 can contain the plurality of cargo profiles 232, prepackaged cargo parameters 242, buildup/break down storage parameters 252, a scheduling model 262, priority groupings 272, locations of cargo with cargo profiles 274, facility maps 282, virtual map with cargo 284 and alerts 292.

The administrative data storage 124 can have computer instructions 240 configured to instruct the administrative data storage use the plurality of cargo profiles simultaneously to determine if the cargo progresses to the security inspection zone or bypasses the security inspection zone, the automatic storage and retrieval system zone, the cargo build up/break down area, the floor connection, mechanism, the transfer vehicle unit load device area, and the government agency zone to one of the landside entry/exit areas or to the airside entry/exit area by matching each cargo profile to prepackaged cargo parameters.

The administrative data storage 124 can have computer instructions 250 configured to instruct the administrative processor to compare the plurality of cargo profiles simultaneously to buildup/break down storage parameters in the administrative data storage to perform one of: transfer cargo to the automatic storage and retrieval system zone, transfer cargo to build up/break down area, and transfer cargo to the transfer vehicle unit load device area.

The administrative data storage 124 can have computer instructions 260 configured to instruct the administrative processor to automatically map cargo using the plurality of cargo profiles simultaneously to a scheduling model for a plurality of land based transport vehicles and a plurality of air based transport vehicles to identify transport vehicles receiving cargo.

The administrative data storage 124 can have computer instructions 270 configured to instruct the administrative processor to transmit locations of cargo with cargo profiles via the network to at least one client device of at least one tenant using priority groupings 272 tied to ownership of the cargo, ownership of the transport vehicle, ownership of the floor of the center, and federal agencies supplying approval to receive and deploy cargo.

The administrative data storage 124 can have computer instructions 280 configured to instruct the administrative processor to periodically transmit a virtual map with cargo depicting locations of cargo to at least one client device of at least one tenant, using facility maps in the administrative data storage and the priority groupings stored in the administrative data storage based on ownership of the cargo, ownership of the transport vehicle, ownership of the secured floor, and federal agencies supplying approval to receive and deploy cargo.

The administrative data storage 124 can have computer instructions 290 configured to instruct the administrative processor to provide alerts to at least one client device of the at least one tenant using priority groupings stored in the administrative data storage based on ownership of the cargo, ownership of the transport vehicle, ownership of the secure floor, and federal or government agencies supplying approval to receive and deploy cargo when space limitations require changes in cargo movement.

In embodiments, at least one tenant can store alerts 292 in the administrative data storage 124, which can send the alerts, such as a notification to the client device if one of the areas is bypassed. The notifications can be a text message, an email, or similar notification that can alert the tenant or user.

Figure 8:
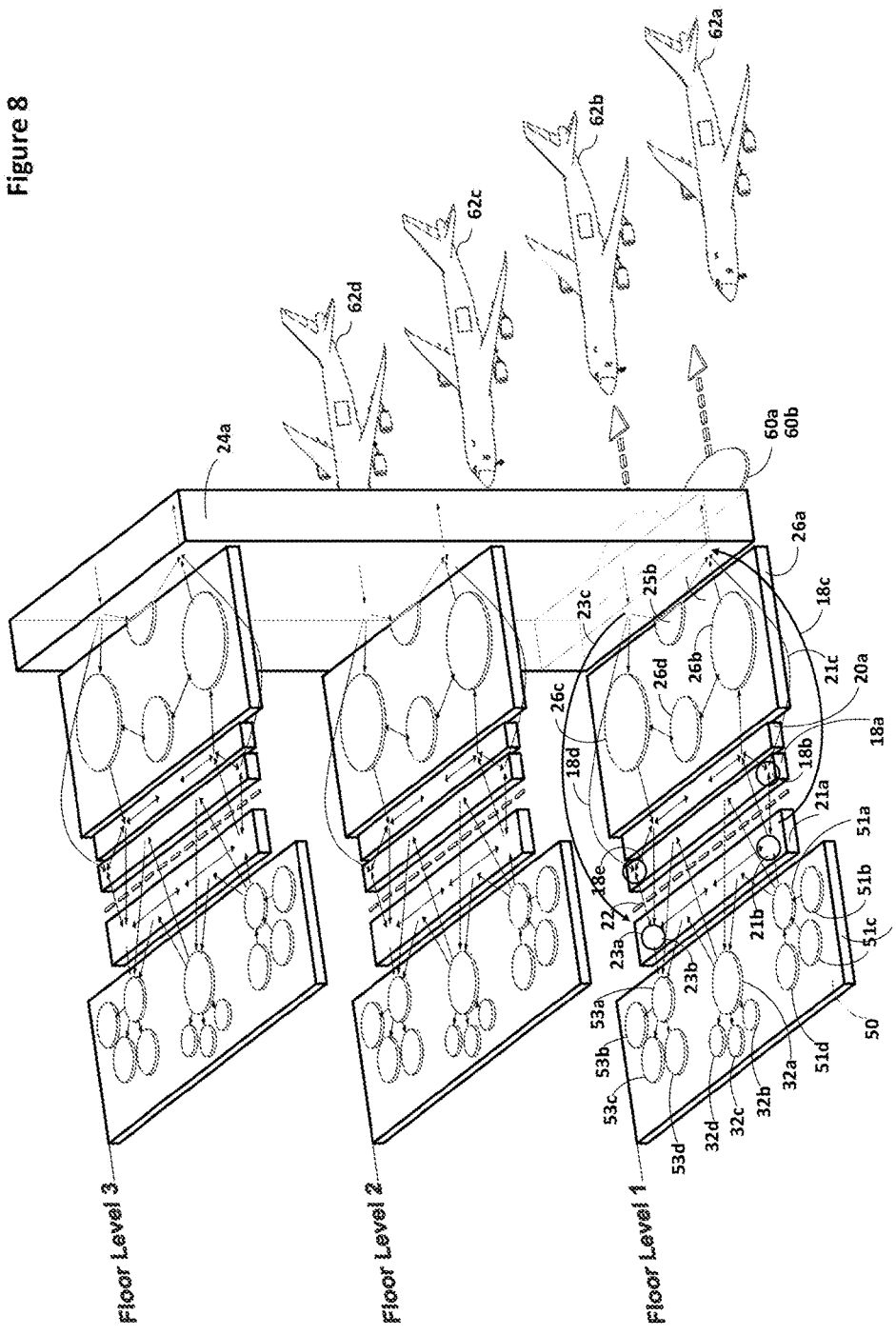
FIG. 8 depicts axonometric flow diagram of a single-structure multi-tenant multi-user multi-airline cargo consolidation and processing center according to one or more embodiments.

FIG. 8 depicts axonometric flow diagram of the multi-tenant multi-user multi-airline cargo consolidation and processing center.

The multi tenant multi-user multi-airline cargo consolidation and processing center is a single-structure with three secure floors.

Figure 9:
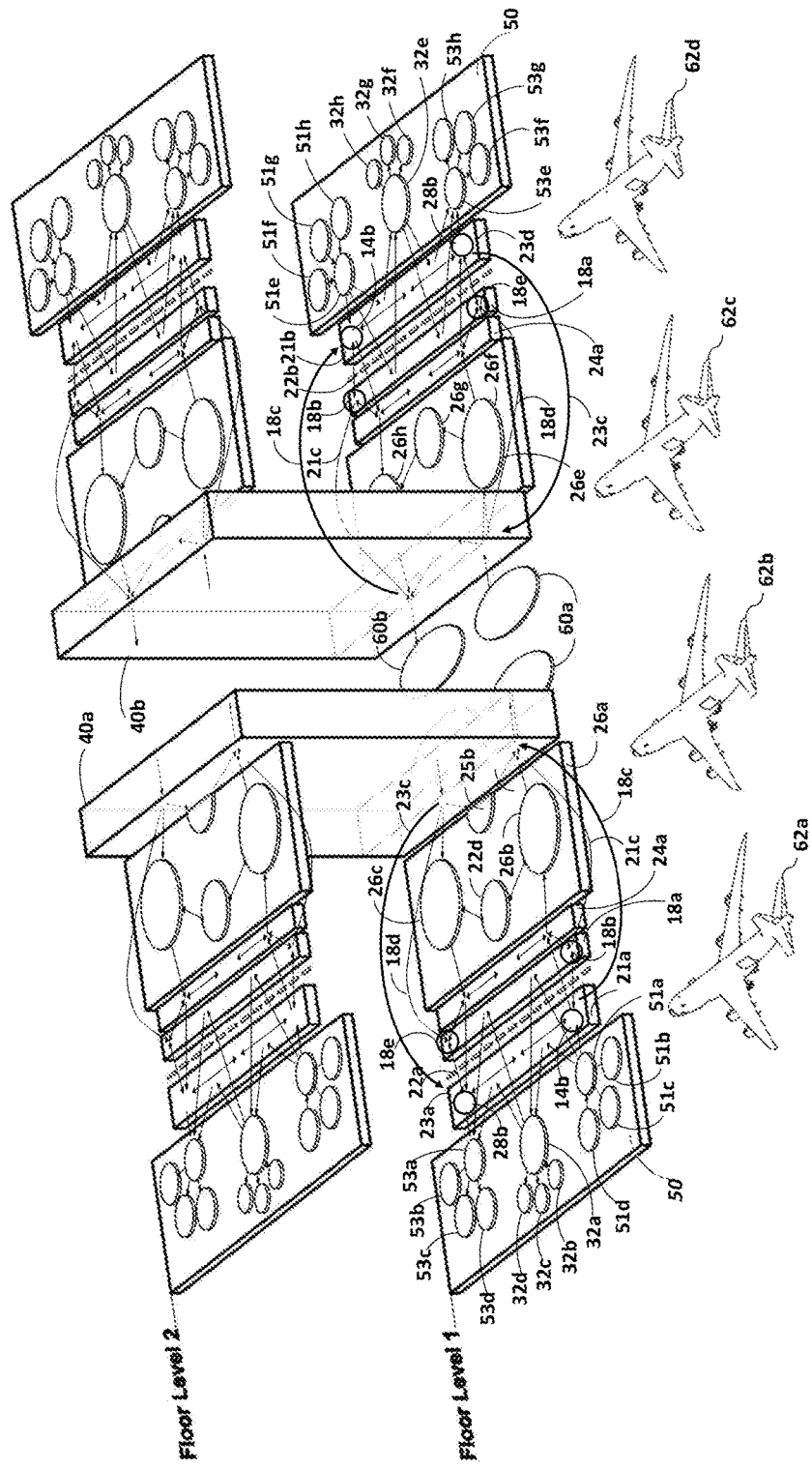
FIG. 9 depicts axonometric flow diagram of a double-structure multi-tenant multi-user multi-airline cargo consolidation and processing center according to one or more embodiments.

FIG. 9 depicts an axonometric flow diagram of the multi-tenant multi-user multi-airline cargo consolidation and processing center.

The multi-tenant multi-user multi-airline cargo consolidation and processing center is a double-structure with two secure floors.

Example 1

As an example of the multi-tenant multi-user multi-airline cargo consolidation and processing center for processing cargo operably connected to an airport the facility can include an enclosed high security small footprint two-part multi-level structure that is 4 stories tall with a width of 500 feet by 250 feet per part as per FIGS. 4A-4D.

The multi-tenant multi-airline cargo consolidation and processing center has 8 secure floors in the 4-story enclosed high security small footprint structure.

Each secure floor is 500 feet by 250 feet and there may be two floors each level in the two-part multi-level structure. Each secure floor is under the control of at least one tenant. In this example, Level 1 has two secure floors controlled by an airline, such as Singapore Airlines. Floor 2 has one secure floor controlled by an airline, such as Delta Airlines and the other secure floor is controlled by another airline, such as Southwest Airlines. Floor 3 and a portion of Floor 4 has 3 secure floors controlled by an airline, such as United Air Lines. The remaining portion of Floor 4 is unoccupied.

In this example, a secure landside cargo acceptance and delivery area that is 50 feet by 500 feet receives cargo from ABC Trucking Company.

A 30 foot by 500 feet security inspection zone for inspecting the cargo is connected to the secure landside cargo acceptance and delivery area used by ABC Trucking Company. The security inspection, electronic scanning, and physical observance is conducted by a third-party security service provider, XYZ Security Company or by the tenant.

This Floor Level provides optional space for Freight Forwarder A operations including build up and breakdown activities.

An automatic storage and retrieval system zone is included for storing and delivering cargo piece goods and small parcels.

A static rack storage zone is included for storage and retrieval of bulk-cargo or piece-cargo goods via forklift vehicles or by hand-controlled devices, such as hand-trucks, before build-up of palletized cargo or cargo within unit load devices, or after break-down of palletized cargo or cargo within unit load devices.

Robotic work stations are included for the build-up of palletized or unit load device-placed cargo, or for the break-down of palletized or unit load device-placed cargo.

Example 1 includes a cargo build up/break down area or work station area, which can be a space within a portion of a floor, such as 40 feet×55 feet each, to build up the cargo or break down the cargo.

Specialized environments, valuable goods vaults, and enclosed space for temperature and humidity controlled areas for perishable, pharmaceutical, high-value products and goods, dangerous goods, flammable goods, radioactive materials, precious jewels, cut and uncut precious stones, bank notes, artwork, and animals can be a space within cargo build up/break down area, such as 45 feet×60 feet.

An intra-floor connection mechanism/pallet and container handling system and transfer vehicle unit load device system for transferring the cargo from or to the plurality of secure floors, such as a vertical conveyor;

The intra-floor connection mechanism/pallet and container handling system and transfer vehicle unit load device system can include as a horizontal travel transfer vehicle mechanism ("TV") or an elevating transfer vehicle mechanism ("ETV").

A specialized function area/robotics area/government inspection zone connected to the transfer vehicle unit load device area for providing customs clearances and other government agency clearances for the cargo;

A forklift and other moving transfer equipment recharge area, such as a battery recharge station, compressed natural gas, or hydrogen fuel cell recharge station;

A robotic equipment area to build-up and break-down pallets and unit load devices, which would support a dedicated robotic work platform or a plurality of platforms, such can be a 25 feet×40 feet space each in a portion of a floor;

The multi-tenant multi-airline cargo consolidation and processing center includes a plurality of landside entry/exit areas. Each landside entry/exit area is used for at least one of the plurality of secure floors. Each landside entry/exit area can receive and transfer the cargo to and from a plurality of land based transport vehicles, such as a plurality of secure truck docks, incorporating electrically operated overhead security doors, electrically operated security grills and hydraulic dock levelers in an area of the facility which can be 50 feet by a length that is a multiple of the number of truck docks.

An airside entry/exit area can be connected to specialized function area/robotics area/government inspection zone, which can be a space within a portion of the cargo operations floor area. The airside entry/exit area can be configured for receiving and transferring the cargo to and from a plurality of air based transport vehicles, such as aircraft, tugs and dollies, trucks, vans, forklifts, transporters, and other specialized vehicles licensed to operate in secured aircraft operations areas ("AOA") of airports.

This example includes a plurality of landside scanners, wherein at least one landside scanner positioned on each landside entry/exit area, which can be located in a space within a portion of the security scanner and inspection zone, to automatically scan a data device on the cargo. Each landside scanner can be connected to a network.

At least one airside scanner positioned on each airside entry/exit area, which can be located in a space within a portion of the secured cargo operations floor area. At least one airside scanner can be located in a space within a portion of the secured cargo operations floor area, positioned to automatically scan the data device on the cargo. At least one airside scanner can be connected to the network.

An administrative processor in communication with the network, an administrative display, and an administrative data storage, the administrative data storage, which can be a space within a portion of the facility further comprising:

Computer instructions to instruct the administrative processor to receive cargo information from at least one client device controlled by at least one tenant, the cargo information provided in advance of the cargo arriving at the enclosed high security small footprint multi-level structure;

Computer instructions to instruct the administrative processor to automatically is receive scanned cargo information from the plurality of landside scanners and at least one airside scanner creating a plurality of cargo profiles, each cargo profile for each piece of cargo;

Computer instructions to instruct the administrative data storage to use the plurality of cargo profiles simultaneously to determine if the cargo progresses to the security inspection zone or bypasses the security inspection zone, the automatic storage and retrieval system zone, the cargo build up/break down area, the floor connection mechanism, the transfer vehicle unit load device area, and the government agency zone to one of the landside entry/exit areas or to the airside entry/exit area by matching each cargo profile to prepackaged cargo parameters stored in the administrative data storage;

Computer instructions to instruct the administrative processor to compare the plurality of cargo profiles simultaneously to buildup/break down storage parameters in the administrative data storage to perform one of:

Transfer the cargo to and from the automatic storage and retrieval system zone, which can be a space within the facility, such as 100 feet×250 feet;

Transfer the cargo and from to the cargo bulk up/break down area, which can be a space within the facility, such as 150 feet×350 feet; or Transfer the cargo to the transfer vehicle unit load storage and retrieval device area, which can be a space, such as 85 feet×550 feet, within the facility adjacent to the secured airside operations area;

Transfer intact pallets or intact unit load devices to and from landside cargo acceptance and delivery area and, after security inspection or after government inspection, to and from the cargo build up/break down area or directly to and from airside operations area;

Computer instructions to instruct the administrative processor to automatically map the cargo using the plurality of cargo profiles simultaneously to a scheduling model for the plurality of land based transport vehicles and the plurality of air based transport vehicles to identify transport vehicles to receive the cargo;

Computer instructions to instruct the administrative processor to transmit locations of the cargo with the plurality of cargo profiles via the network to the at least one client device of the at least one tenant using priority groupings tied to ownership of the cargo, ownership of the transport vehicle, ownership of the secure floor, and federal agencies supplying approval to receive and deploy the cargo;

Computer instructions to instruct the administrative processor to periodically transmit a virtual map with cargo depicting locations of the cargo to the at least one client device of the at least one tenant using facility maps and the priority groupings stored in the administrative data storage based on the ownership of the cargo, the ownership of the transport vehicle, the ownership of the secure floor, and the federal agencies supplying approval to receive and deploy the cargo; and Computer instructions to instruct the administrative processor to provide alerts to the at least one client device of the at least one tenant using the priority groupings stored in the administrative data storage based on the ownership of the cargo, the ownership of the transport vehicle, the ownership of the secure floor, and the federal agencies supplying approval to receive and deploy the cargo when space limitations require changes in cargo movement.

Example 2

As an example of the multi-tenant multi-user multi-airline cargo consolidation and processing center for processing cargo operably connected to an airport the can include an enclosed high security small footprint one-part multi-level structure that is 4 stories tall with a width, which can measure 500 feet by 250 feet per part as per FIG. 8.

The facility has 4 secure floors in the one-part 4-story enclosed high security small footprint structure.

Each secure floor can be of varying measure, such as 500 feet×250 feet, depending on airport land parcel geometries. Each secure floor is under the control of at least one tenant. In this example, Floor 1 has one secure floor controlled by an airline, such as American Airlines. Floor 2 has one secure floor controlled by an airline, such as Delta Airlines, Floor 3 has one secure floor controlled by another airline, such as United Air Lines. Floor 4 has one secure floor a portion of which is controlled by Freight Forwarder ABC and the other portion controlled by Logistics Company XYZ.

In this example, a secure landside cargo acceptance and delivery area, which can measure 50 feet by 500 feet, and 50 feet by 250 feet for each tenant on Floor 4, located on each floor, receives cargo from different trucking companies and shippers.

A security inspection zone, which can be a space within the facility, such as 30 feet×500 feet, for inspecting the cargo is connected to the secure landside cargo acceptance and delivery area used by different trucking companies. The security inspection, electronic scanning, and physical observance is conducted by a third-party security service provider, such as XYZ Security Company or by the tenant.

This Floor Level provides optional space within the facility for Freight Forwarder A operations, such as 150 feet×500 feet, including build up and break down activities;

An automatic storage and retrieval system zone for storing and delivering cargo piece goods and small parcels, which can be a space within the facility, such as 50 feet×200 feet;

Static rack storage zone for storage and retrieval of bulk-cargo or piece-cargo goods before build-up of palletized cargo or cargo within unit load devices, or after break-down of palletized cargo or cargo within unit load devices;

Robotic work stations for the build-up of palletized or unit load device-placed cargo, or for the break-down of palletized or unit load device-placed cargo;

A cargo build up/break down area to build up the cargo or break down the cargo, which can be a space within the facility, such as 100 feet×300 feet;

Specialized environments, vaults, and enclosed space for temperature and humidity controlled areas for perishable, pharmaceutical, high-value products and goods, dangerous goods, flammable goods, radioactive materials, precious jewels, cut and uncut precious stones, bank notes, artwork, and animals, which can be spaces within the cargo build up/break down area, such as specific environments measuring 40 feet×50 feet each;

A floor connection mechanism/pallet and container handling system and transfer vehicle unit load device system (TV ULD) for transferring the cargo front or to the plurality of secure floors, such as a cargo freight elevator;

A floor connection mechanism/pallet and container handling system and transfer vehicle unit load device system can include a horizontal travel transfer vehicle mechanism ("TV") or an elevating transfer vehicle mechanism ("ETV").

A specialized function area/robotics area/government inspection zone connected to the transfer vehicle unit load device area for providing customs clearances and other government agency clearances for the cargo, which would be space within the cargo build up/break down area, such as 30 feet×100 feet;

This example can include a forklift and other moving transfer equipment recharge area, such as a battery recharge station, compressed natural gas, or hydrogen fuel cell recharge station;

The specialized function area/robotics area/government inspection zone includes a robotic equipment area to build-up and break-down pallets and unit load devices, which would support a dedicated robotic work platform or a plurality of platforms, such can be a 25 feet×40 feet space each in a portion of a floor.

The multi-tenant multi-user multi-airline CCPC includes a plurality of landside entry/exit areas for at least one of the plurality of secure floors. Each landside entry/exit area can receive and transfer the cargo to and from a plurality of land based transport vehicles, such as a plurality of secure truck docks, each incorporating electrically operated overhead security doors, electrically operated security grills and hydraulic dock levelers in an area of the facility which can be 50 feet by a length that is a multiple of the number of truck docks.

An airside entry/exit area can be a space adjacent to the cargo operations floor area, connected to the government agency zone, the airside entry/exit area is configured for receiving and transferring the cargo to and from a plurality of air based transport vehicles, such as aircraft, tugs and dollies, trucks, vans, forklifts, transporters, and other specialized vehicles licensed to operate in secured aircraft operations areas ("ACM") of airports;

A plurality of landside scanners can be located in a space within a portion of a security scanner and inspection zone, wherein at least one landside scanner positioned on each security scanner and inspection zone to automatically scan a data device on the cargo. Each landside scanner can be connected to a network.

At least one airside scanner can be positioned on each airside entry/exit area, which can be located in a space within a portion of the secured cargo operations floor area and positioned to automatically scan the data device on the cargo. The at least one airside scanner can be connected to the network.

An administrative processor, which can be a space within a portion of the facility, in communication with the network, an administrative display, and an administrative data storage, the administrative data storage further comprising:

Computer instructions to instruct the administrative processor to receive cargo information from at least one client device controlled by the at least one tenant, the cargo information provided in advance of the cargo arriving at the enclosed high security small footprint multi-level structure;

Computer instructions to instruct the administrative processor to automatically receive scanned cargo information from the plurality of landside scanners and the at last one airside scanner creating a plurality of cargo profiles, each cargo profile for each piece of cargo;

Computer instructions to instruct the administrative data storage to use the plurality of cargo profiles simultaneously to determine if the cargo progresses to the security inspection zone or bypasses the security inspection zone, the automatic storage and retrieval system zone, the cargo build up/break down area, the floor connection mechanism, the transfer vehicle unit load device area, and the government agency zone to one of the landside entry/exit areas or to the airside entry/exit area by matching each cargo profile to prepackaged cargo parameters stored in the administrative data storage;

Computer instructions to instruct the administrative processor to compare the plurality of cargo profiles simultaneously to buildup/break down storage parameters in the administrative data storage to perform one of:

Transfer the cargo to and from the automatic storage and retrieval system zone, which can be a space within the facility, such as 100 feet×250 feet;

Transfer the cargo to and from the cargo build up/break down area, which can be a space within the facility, such as 150 feet×350 feet; or Transfer the cargo to and from the transfer vehicle unit load device area, which can be a space, such as 85 feet×550 feet, within the facility adjacent to the secured airside operations area;

Transfer intact pallets or intact unit load devices to and from landside cargo acceptance and delivery area and, after security inspection or after government inspection, to and from the cargo build up/break down area or directly to and from airside operations area;

Computer instructions to instruct the administrative processor to automatically map the cargo using the plurality of cargo profiles simultaneously to a scheduling model for the plurality of land based transport vehicles and the plurality of air based transport vehicles to identify transport vehicles to receive the cargo;

Computer instructions to instruct the administrative processor to transmit locations of the cargo with the plurality of cargo profiles via the network to at least one client device of at least one tenant using priority groupings tied to ownership of the cargo, ownership of the transport vehicle, ownership of the secure floor, and federal agencies supplying approval to receive and deploy the cargo;

Computer instructions to instruct the administrative processor to periodically transmit a virtual map with cargo depicting locations of the cargo to at least one client device of at least one tenant using facility maps and the priority groupings stored in the administrative data storage based on the ownership of the cargo, the ownership of the transport vehicle, the ownership of the secure floor, and the federal agencies supplying approval to receive and deploy the cargo; and Computer instructions to instruct the administrative processor to provide alerts to at least one client device of the at least one tenant using the priority groupings stored in the administrative data storage based on the ownership of the cargo, the ownership of the transport vehicle, the ownership of the secure floor, and the federal agencies supplying approval to receive and deploy the cargo when space limitations require changes in cargo movement.

Example 3

As an example of the multi-tenant multi-user multi-airline cargo consolidation and processing center for processing cargo operably connected to an airport the facility can include an enclosed high security small footprint one-part or two-part multi-level structure that is 4 stories tall with a width, which can measure 300 feet by 450 feet per part as per FIGS. 3 and 4A-4D.

The facility has 4 levels with 3 secure floors in the one-part structure or 6 secure floors in the two-part structure within the cargo operations portion of the structure. Roof Level 4 has one or two secure floors for administrative offices, cargo support operations such as food service, training, hospitality, banking, retail, and flight simulators. It is also contemplated that Example 3 includes rooftop areas for drone operations in the one-part or two-part 4-story enclosed high security small footprint structure.

Each secure floor, which can measure 500 feet by 300 feet. Each secure floor is under the control of at least one tenant. In this example, Floor 1 of the one-part structure can have one secure floor controlled by an airline, such as Air China Airlines, and in the two-part structure another secure floor controlled by another airline, such as Atlas Air. Floor 2 of the one-part structure can have one secure floor controlled by airlines, such as Delta Air Lines; Floor 2 of the two-part structure can have one secure floor controlled by Delta and the other by another airline, such as Lufthansa Airlines. Floor 3 of the one-part structure can have one secure floor controlled by some other airline, such as United Air Lines; Floor 3 of the two-part structure can have one secure floor controlled by an airline, such as United Air Lines, and the other by another airline, such as British Air.

Floor 4 can have one or two secure floors a portion of which is controlled by administrative services associated with tenants in the lower floors with other portions controlled by service provider companies providing specialized cargo support services, such as flight simulation, hospitality, training, retail, banking and/or food services.

In this example, a secure landside cargo acceptance and delivery area, which can measure 50 feet by 500 feet located on Floor Levels 1 through 3, receives cargo from different trucking companies and shippers and dispatches cargo to different trucking companies and consignees.

On Floors Levels 1 through 3, security inspection zone for inspecting the cargo, which can be a space connected to the secure landside cargo acceptance and delivery area that can measure 30 feet×500 feet used by different trucking companies. The security inspection, electronic scanning, and physical observance can be conducted by a third-party security service provider, XYZ Security Company, or by the tenant.

Floor Levels 1 through 3 can provide optional space for Freight Forwarder A, AB, AC and AD operations including build up and break down activities, such space could measure 100 feet×200 feet each;

An automatic storage and retrieval system zone is included for storing and delivering cargo piece goods and small parcels, which can be a space within the facility, such as 50 feet×200 feet.

This example can include a static rack storage zone for storage and retrieval of bulk-cargo or piece-cargo goods before build-up of palletized cargo or cargo within unit load devices, or after break-down of palletized cargo or cargo within unit load devices.

Robotic work stations are included for the build-up of palletized or unit load device-placed cargo, or for the break-down of palletized or unit load device-placed cargo.

The multi-tenant multi-user multi-airline CCPC includes a cargo build up/break down area to build up the cargo or break down the cargo, which can be a space within the facility, such as 200 feet×300 feet;

Specialized environments, vaults, and an enclosed space for temperature and humidity controlled areas for perishable, pharmaceutical, high-value products and goods, dangerous goods, flammable goods, radioactive materials, precious jewels, cut and uncut precious stones, bank notes, artwork, and animals can be spaces within the cargo build up/break down area, such as specific environments measuring 50 feet×50 feet each.

A floor connection mechanism/pallet and container handling system and transfer vehicle unit load device system can be used for transferring the cargo from or to the plurality of secure floors, such as a cargo vertical conveyor;

The floor connection mechanism/pallet and container handling system and transfer vehicle unit load device system a horizontal travel transfer vehicle mechanism ("TV") or an elevating transfer vehicle mechanism ("ETV");

A specialized function area/robotics area/government inspection zone can be connected to the transfer vehicle unit load device area for providing customs clearances and other government agency clearances for the cargo, which would be space within the cargo build up/break down area, such as 30 feet×50 feet.

A forklift and other moving transfer equipment recharge area, such as a battery recharge station, compressed natural gas, or hydrogen fuel cell recharge station;

The floor connection mechanism/pallet and container handling system and transfer vehicle unit load device system can include a robotic equipment area to build-up and break-down pallets and unit load devices, which would support a dedicated robotic work platform or a plurality of platforms, such can be a 25 feet×40 feet space each in a portion of a floor.

This example includes a plurality of landside entry/exit areas, Each landside entry/exit area can be used for at least one of the plurality of secure floors. Each landside entry/exit area can receive and transfer the cargo to and from a plurality of land based transport vehicles, such as a plurality of secure truck docks, each incorporating electrically operated overhead security doors, electrically operated security grills and hydraulic dock levelers in an area of the facility which can be 50 feet by a length that is a multiple of the number of truck docks.

An airside entry/exit area can be a space within a portion of the cargo operations floor area, connected to the specialized function area/robotics area/government inspection zone, the airside entry/exit area is configured for receiving and transferring the cargo to and from a plurality of air based transport vehicles;

A plurality of landside scanners, which can be located in a space within a portion of a security scanner and inspection zone, wherein at least one landside scanner positioned on each security scanner and inspection zone to automatically scan a data device on the cargo. Each landside scanner can be connected to a network.

At least one airside scanner can be located in a space within a portion of the secured cargo operations floor area positioned on each airside entry/exit area and connected to the network. The at least one airside scanner can be positioned to automatically scan the data device on the cargo.

An administrative processor, which can be a space within a portion of the facility, in communication with the network, an administrative display, and an administrative data storage, the administrative data storage further comprising:

Computer instructions to instruct the administrative processor to receive cargo information from at least one client device controlled by the at least one tenant, the cargo information provided in advance of the cargo arriving at the enclosed high security small footprint multi-level structure;

Computer instructions to instruct the administrative processor to automatically receive scanned cargo information from the plurality of landside scanners and at last one airside scanner creating a plurality of cargo profiles, each cargo profile for each piece of cargo;

Computer instructions to instruct the administrative data storage to use the plurality of cargo profiles simultaneously to determine if the cargo progresses to the security inspection zone or bypasses the security inspection zone, the automatic storage and retrieval system zone, the cargo build up/break down area, the floor connection mechanism, the transfer vehicle unit load device area, and the government agency zone to one of the landside entry/exit areas or to the airside entry/exit area by matching each cargo profile to prepackaged cargo parameters stored in the administrative data storage;

Computer instructions to instruct the administrative processor to compare the plurality of cargo profiles simultaneously to buildup/break down storage parameters in the administrative data storage to perform one of:

Transfer the cargo to and from the automatic storage and retrieval system zone, which can be a space within the facility, such as 100 feet×150 feet;

Transfer the cargo to and from the cargo build up/break down area, which can be a space within the facility, such as 150 feet×250 feet; or Transfer the cargo to and from the transfer vehicle unit load device area, which can be a space, such as 100 feet×250 feet, within the facility adjacent to the secured airside operations area;

Transfer intact pallets or intact unit load devices to and from landside cargo acceptance and delivery area and, after security inspection or after government inspection, to and from the cargo build up/break down area or directly to and from airside operations area;

Computer instructions to instruct the administrative processor to automatically map the cargo using the plurality of cargo profiles simultaneously to a scheduling model for the plurality of land based transport vehicles and the plurality of air based transport vehicles to identify transport vehicles to receive the cargo;

Computer instructions to instruct the administrative processor to transmit locations of the cargo with the plurality of cargo profiles via the network to at least one client device of at least one tenant using priority groupings tied to ownership of the cargo, ownership of the transport vehicle, ownership of the secure floor, and federal agencies supplying approval to receive and deploy the cargo;

Computer instructions to instruct the administrative processor to periodically transmit a virtual map with cargo depicting locations of the cargo to at least one client device of at least one tenant using facility maps and the priority groupings stored in the administrative data storage based on the ownership of the cargo, the ownership of the transport vehicle, the ownership of the secure floor, and the federal agencies supplying approval to receive and deploy the cargo; and Computer instructions to instruct the administrative processor to provide alerts to at least one client device of at least one tenant using the priority groupings stored in the administrative data storage based on the ownership of the cargo, the ownership of the transport vehicle, the ownership of the secure floor, and the federal agencies supplying approval to receive and deploy the cargo when space limitations require changes in cargo movement.

While these embodiments have been described with emphasis on the embodiments, it should be understood that within the scope of the appended claims, the embodiments might be practiced other than as specifically described herein.

What is claimed is:

1. A multi-level multi-tenant multi-airline cargo consolidation and processing center for processing cargo operably connected to an airport comprising:
   a. an enclosed high security small footprint multi-level structure;
   b. a plurality of secure floors in the enclosed high security small footprint structure, each secure floor under the control of at least one tenant, each secure floor consisting of:
      (i) a secure landside cargo acceptance and delivery area for receiving the cargo;
      (ii) a security scanner and inspection zone for inspecting the cargo; and
      (iii) an automatic storage and retrieval system zone for storing the cargo;
      (iv) a cargo build up/break down area to build up the cargo or break down the cargo; and
      (v) specialized function area/robotics area/government inspection zone for providing customs clearances and other government agency clearances for the cargo;
   c. a floor connection mechanism/pallet and container handling system and transfer vehicle unit load device system for transferring the cargo from or to the plurality of secure floors;
   d. a plurality of landside entry/exit areas, each landside entry/exit area for at least one of the plurality of secure floors each landside entry/exit area for receiving and transferring the cargo to and from a plurality of land based transport vehicles;
   e. an airside entry/exit area connected to the specialized function area/robotics area/government inspection zone, the airside entry/exist area configured for receiving and transferring the cargo to and from a plurality of air based transport vehicles;
   f. a plurality of landside scanners, wherein at least one landside scanner positioned on each landside entry/exit area to automatically scan a data device on the cargo, each landside scanner connected to a network;
   g. at least one airside scanner positioned on each airside entry/exit area, the at least one airside scanner positioned to automatically scan the data device on the cargo, the at least one airside scanner connected to the network; and
   h. an administrative processor in communication with the network, an administrative display, and an administrative data storage, the administrative data storage further comprising:
      (i) computer instructions to instruct the administrative processor to receive cargo information from at least one client device controlled by the at least one tenant, the cargo information provided in advance of the cargo arriving at the enclosed high security small footprint multi-level structure;
      (ii) computer instructions to instruct the administrative processor to automatically receive scanned cargo information from the plurality of landside scanners and the at last one airside scanner creating a plurality of cargo profiles, each a cargo profile for each piece of cargo;
      (iii) computer instructions to instruct the administrative processor to use the plurality of cargo profiles simultaneously to determine if the cargo progresses to the security inspection zone or bypasses the security inspection zone, the automatic storage and retrieval system zone, the cargo build up/break down area, the floor connection mechanism/pallet and container handling system transfer vehicle unit load device area, and the specialized function area/robotics area/government inspection zone to one of the landside entry/exit areas or to the airside entry/exit area by matching each cargo profile to prepackaged cargo parameters stored in the administrative data storage:
      (iv) computer instructions to instruct the administrative processor to compare the plurality of cargo profiles simultaneously to buildup/break down storage parameters in the administrative data storage to perform one of:
         1. transfer the cargo to the automatic storage and retrieval system zone;
         2. transfer the cargo to the cargo build up/break down area; or
         3. transfer the cargo to the floor connection mechanism/pallet and container handling system transfer vehicle unit load device area;
         4. transfer the cargo to air based transport vehicles via airside entry/exit area;

(v) computer instructions to instruct the administrative processor to automatically map the cargo using the plurality of cargo profiles simultaneously to a scheduling model for the plurality of land based transport vehicles and the plurality of air based transport vehicles to identify transport vehicles to receive the cargo;

(vi) computer instructions to instruct the administrative processor to transmit locations of the cargo with the plurality of cargo profiles via the network to at least one client device of at least one tenant using priority groupings tied to ownership of the cargo, ownership of the transport vehicle, ownership of the secure floor, and federal government agencies-supplying approval to receive and deploy the cargo;

(vii) computer instructions to instruct the administrative processor to periodically transmit a virtual map with cargo depicting locations of the cargo to at least one client device of the at least one tenant using facility maps and the priority groupings stored in the administrative data storage based on the ownership of the cargo, the ownership of the transport vehicle, the ownership of the secure floor, and the federal government agencies supplying approval to receive and deploy the cargo; and (viii) computer instructions to instruct the administrative processor to provide alerts to at least one client device of at least one tenant using the priority groupings stored in the administrative data storage based on the ownership of the cargo, the ownership of the transport vehicle, the ownership of the secure floor, and the federal government agencies supplying approval to receive and deploy the cargo when space limitations require changes in cargo movement.

2. The multi-tenant multi-user multi-airline cargo consolidation and processing center of claim 1, wherein the data device on the cargo is a radio frequency identifier device.

3. The multi-tenant multi-user multi-airline cargo consolidation and processing center of claim 1, wherein the data device on the cargo is computer readable medium with electronic air bills.

4. The multi-tenant multi-user multi-airline cargo consolidation and processing center of claim 1, wherein the data device on the cargo is an air bill readable by an optical character recognition reader connected to the network to electronically convert the air bill into a cargo profile and transmits the cargo profile to the administrative processor via the network.

5. The multi-tenant multi-user multi-airline cargo consolidation and processing center of claim 1, wherein at least a portion of one of the plurality of secure floors is temperature and humidity controlled, and wherein the cargo information contains humidity and temperature requirements.

6. The multi-tenant multi-user multi-airline cargo consolidation and processing center of claim 1, comprising a freight forwarder build up and break down zone for allowing a third party user to build up cargo for an airside delivery and breakdown or buildup cargo for landside delivery in at least one of the plurality of secure floors.

7. The multi-tenant multi-user multi-airline cargo consolidation and processing center of claim 1, further comprising at least one alarm and sensor device in at least one zone to actuate an alarm when a sensor detects the cargo exceeds a geographic location on at least one of the plurality of secure floors in the multi-tenant multi-airline cargo consolidation and processing center based on the cargo information in the cargo profile.

8. The multi-tenant multi-user multi-airline cargo consolidation and processing center of claim 1, wherein the at least one tenant is a consignor, a shipper, a recipient, or a freight forwarder.

\* \* \* \* \*